US012387732B2

(12) United States Patent
Zhang et al.

(10) Patent No.: US 12,387,732 B2
(45) Date of Patent: Aug. 12, 2025

(54) INTER-CHANNEL PHASE DIFFERENCE PARAMETER ENCODING METHOD AND APPARATUS

(71) Applicant: HUAWEI TECHNOLOGIES CO., LTD., Guangdong (CN)

(72) Inventors: Xingtao Zhang, Shenzhen (CN); Haiting Li, Shenzhen (CN); Zexin Liu, Shenzhen (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/763,087

(22) Filed: Jul. 3, 2024

(65) Prior Publication Data

US 2024/0355342 A1 Oct. 24, 2024

Related U.S. Application Data

(63) Continuation of application No. 18/069,573, filed on Dec. 21, 2022, now Pat. No. 12,067,993, which is a (Continued)

(30) Foreign Application Priority Data

Jun. 30, 2017 (CN) ......................... 201710524352.0

(51) Int. Cl.

| | |
|---|---|
| ***G10L 19/008*** | (2013.01) |
| ***G10L 19/032*** | (2013.01) |
| ***H04S 3/00*** | (2006.01) |

(52) U.S. Cl.

CPC .......... *G10L 19/008* (2013.01); *G10L 19/032* (2013.01); *H04S 3/008* (2013.01); *H04S 2400/03* (2013.01); *H04S 2420/03* (2013.01)

(58) Field of Classification Search

CPC ..... G10L 19/008; G10L 19/032; H04S 3/008; H04S 2400/03; H04S 2420/03

See application file for complete search history.

(56) References Cited

U.S. PATENT DOCUMENTS

| | | | |
|---|---|---|---|
| 11,031,021 | B2 | 6/2021 | Zhang et al. |
| 2011/0123031 | A1 | 5/2011 | Ojala |

(Continued)

FOREIGN PATENT DOCUMENTS

| | | | |
|---|---|---|---|
| CN | 102165519 | A | 8/2011 |
| CN | 103559884 | A | 2/2014 |

(Continued)

OTHER PUBLICATIONS

ITU-T G.722. Series G: Transmission Systems And Media, Digital Systems And Networks. Digital terminal equipments—Coding of voice and audio signals. 7 kHz audio-coding within 64 kbit/s. Sep. 2012, total 274 pages.

(Continued)

*Primary Examiner* — Mark Fischer

(74) *Attorney, Agent, or Firm* — WOMBLE BOND DICKINSON (US) LLP

(57) ABSTRACT

The present disclosure discloses an inter-channel phase difference parameter encoding method, where a current frame is obtained; a signal type and a previous IPD parameter encoding scheme of a previous frame are obtained; a current IPD parameter encoding scheme is obtained at least based on the signal type of the previous frame and the previous IPD parameter encoding scheme; and an IPD parameter of the current frame is processed based on the current IPD parameter encoding scheme.

20 Claims, 5 Drawing Sheets

Related U.S. Application Data continuation of application No. 17/319,353, filed on May 13, 2021, now Pat. No. 11,568,882, which is a continuation of application No. 16/723,449, filed on Dec. 20, 2019, now Pat. No. 11,031,021, which is a continuation of application No. PCT/CN2018/085756, filed on May 5, 2018.

(56) References Cited

U.S. PATENT DOCUMENTS

| | | | |
|---|---|---|---|
| 2011/0257968 | A1 | 10/2011 | Kim et al. |
| 2012/0221343 | A1 | 8/2012 | Kim et al. |
| 2014/0098963 | A1 | 4/2014 | Lang et al. |
| 2014/0164001 | A1 | 6/2014 | Lang et al. |
| 2015/0010155 | A1 | 1/2015 | Virette et al. |
| 2015/0025881 | A1 | 1/2015 | Carlos et al. |
| 2016/0254002 | A1 | 9/2016 | Zhang et al. |
| 2017/0365260 | A1* | 12/2017 | Chebiyyam ........... G10L 19/008 |
| 2019/0096411 | A1 | 3/2019 | Zhang et al. |

FOREIGN PATENT DOCUMENTS

| | | | |
|---|---|---|---|
| CN | 104246873 | A | 12/2014 |
| CN | 104681029 | A | 6/2015 |
| CN | 107452387 | A | 12/2017 |
| EP | 2169664 | A2 | 3/2010 |
| EP | 2296142 | A2 | 3/2011 |
| EP | 3451331 | A1 | 3/2019 |
| JP | 2011527456 | A | 10/2011 |
| JP | 2012503792 | A | 2/2012 |
| JP | 2019522233 | A | 8/2019 |
| JP | 2020525847 | A | 8/2020 |
| KR | 1020080031366 | A | 4/2008 |
| KR | 1020140140102 | A | 12/2014 |
| KR | 1020160077201 | A | 7/2016 |
| RU | 2305870 | C2 | 9/2007 |
| WO | 2017206794 | A1 | 12/2017 |
| WO | 2017222871 | A1 | 12/2017 |

OTHER PUBLICATIONS

David Virette et al: "G.722 annex D and G.711.1 Annex F—New ITU-T stereo codecs." May 26, 2013, total 5 pages.

G 722: "ITU-T G.722 7 kHz audio-coding within 64 kbit/s", ITU-T Reconmendation, Sep. 16, 2012 (Sep. 16, 2012), pp. 1-274, XP055147503.

Virette David et al: G. 722 annex D and G.711.1 Annex F—New ITU-T stereo codecs, ICASSP, IEEE International Conference On Acoustics, Speech and Signal Processing—Proceedings 1999 IEEE, IEEE, May 26, 2013 (May 26, 2013), pp. 528-532, XP032508530.

JungHoe Kim et al, "Enhanced stereo coding with phase parameters for MPEG unified speech and audio coding", Audio Engineering Society Convention 127th Convention, Oct. 2009, total 7 pages.

Bertrand Fatus, "Parametric Coding for Spatial Audio," Masters Thesis, KTH, Stockholm, Sweden, Dec. 2015, 70 pages.

* cited by examiner

INTER-CHANNEL PHASE DIFFERENCE PARAMETER ENCODING METHOD AND APPARATUS

CROSS-REFERENCE TO RELATED APPLICATIONS

This application is a continuation of U.S. patent application Ser. No. 18/069,573, filed on Dec. 21, 2022, which is a continuation of U.S. patent application Ser. No. 17/319,353, filed on May 13, 2021, now U.S. Pat. No. 11,568,882, which is a continuation of U.S. patent application Ser. No. 16/723,449, filed on Dec. 20, 2019, now U.S. Pat. No. 11,031,021, which is a continuation of International Application No. PCT/CN2018/085756, filed on May 5, 2018, which claims priority to Chinese Patent Application No. 201710524352.0, filed on Jun. 30, 2017. All of the aforementioned patent applications are hereby incorporated by reference in their entireties.

TECHNICAL FIELD

The present disclosure relates to the field of communications technologies, and in particular, to an inter-channel phase difference parameter encoding method and apparatus.

BACKGROUND

As quality of life is improved, a requirement for high-quality audio is constantly increased. Compared with mono audio, stereo audio presents a sense of orientation and a sense of distribution for each acoustic source, and can improve clarity and intelligibility of audio information and enhance a sense of presence of audio play. Therefore, stereo audio is highly favored by people.

A parametric stereo (PS) encoding technology is a common stereo encoding technology. In the PS encoding technology, encoding and decoding processing is performed on a stereo signal (in other words, a multi-channel signal) based on a spatial perception characteristic. Specifically, encoding and decoding of a multi-channel signal are converted into encoding and decoding of a mono audio signal and encoding and decoding of spatial perception parameters. The spatial perception parameters in PS encoding include inter-channel correlation (IC), an inter-channel level difference (ILD), an inter-channel time difference (ITD), an inter-channel phase difference (IPD), and the like. An ITD parameter and an IPD parameter are spatial perception parameters that indicate horizontal orientation of an acoustic source. An ILD parameter, the ITD parameter, and the IPD parameter determine human ear's perception of a location of the acoustic source, and can effectively determine a sound field location and is important for stereo signal restoration. Therefore, determining of parameters such as the IPD parameter is important for stereo signal restoration.

In the prior art 1, when an IPD parameter of each frame in a stereo signal is calculated, specifically, a time domain signal is transformed into a frequency domain signal, the frequency domain signal is divided into a plurality of subbands, IPD parameters of subbands are calculated one by one, and then the IPD parameters of all subbands are quantized to be used to encode the stereo signal. It can be learned that, calculation of the IPD parameter in the prior art 1 needs to be performed on the subbands one by one. Consequently, a plurality of resources are occupied, and encoding efficiency is low.

In the prior art 2, when an IPD parameter of each frame in a stereo signal is calculated, specifically, a time domain signal is transformed into a frequency domain signal, an IPD parameter of a stereo signal with one frame is calculated based on the frequency domain signal. The IPD parameter of the stereo signal with the frame is a group inter-channel phase difference (group IPD) parameter, and then the group IPD parameter is quantized to be used to encode the stereo signal. It can be learned that, in the prior art, only one IPD parameter (that is, the group IPD parameter) is calculated, and then only one IPD parameter can be quantized. Although less resources are occupied, phase information precision for encoding is low, and encoding quality is poor.

SUMMARY

This application provides an IPD parameter encoding method and apparatus to increase a diversity of selecting an IPD parameter encoding scheme, better maintain phase information, and improve audio encoding quality.

According to a first aspect of the present disclosure, an IPD parameter encoding method is provided and includes:

- obtaining a reference parameter used to determine an IPD parameter encoding scheme of a current frame of a multi-channel signal;
- determining the IPD parameter encoding scheme of the current frame based on the reference parameter, where the determined IPD parameter encoding scheme of the current frame is one of at least two preset IPD parameter encoding schemes; and
- processing an IPD parameter of the current frame based on the determined IPD parameter encoding scheme of the current frame.

It can be learned that when the IPD parameter is encoded, the reference parameter is obtained, the IPD parameter encoding scheme of the current frame corresponding to the current frame is determined based on the reference parameter, and the IPD parameter of the current frame is processed by using the determined IPD parameter encoding scheme, so that not only the IPD parameter of the current frame can be adaptively processed, but also processing of the IPD parameter of the current frame matches with the current frame, to improve encoding quality of the multi-channel signal.

In one embodiment, the reference parameter includes at least one of a signal characteristic parameter of the current frame and signal characteristic parameters of A frames prior to the current frame, and A is an integer not less than 1.

The signal characteristic parameter of the current frame includes at least one of a parameter indicating correlation between left channel and right channel of the current frame, a variance of subband IPD parameters of the current frame, a signal type of the current frame, and the ITD parameter of the current frame.

The signal characteristic parameters of the A frames previous to the current frame include at least one of a parameter indicating correlation between left channel and right channel of each of the previous A frames, a variance of subband IPD parameters of each of the previous A frames, an ITD parameter of each of the previous A frames, an IPD parameter encoding scheme of each of the previous A frames, and a signal type of each of the previous A frames.

The signal type includes a voice type or a music type.

A value of A may be 1, 2, 3, 4, 5, or the like.

It can be learned that, in some cases, when the IPD parameter encoding scheme of the current frame is to be determined, not only the signal characteristic parameter of the current frame is used, but also signal characteristic parameters of the A frames previous to the current frame is used, so that the determined IPD parameter encoding scheme of the current frame not only matches with the current frame but also matches with the A frames previous to the current frame, to ensure continuous continuity of the encoding scheme, and further improve encoding quality.

In one embodiment, the reference parameter includes the parameter indicating the correlation between the left channel and right channel of the current frame.

If a value of the parameter indicating the correlation between the left channel and right channel of the current frame is greater than or equal to a first threshold, the IPD parameter encoding scheme of the current frame is a first encoding scheme in the at least two IPD parameter encoding schemes.

In one embodiment, the first threshold is 0.75.

In one embodiment, the reference parameter includes the IPD parameter encoding scheme of each of the previous A frames and the signal type of each of the previous A frames.

If the IPD parameter encoding scheme of each of the previous A frames is the first encoding scheme in the at least two IPD parameter encoding schemes, and the signal type of each of the previous A frames is a music type, the IPD parameter encoding scheme of the current frame is the first encoding scheme, and the value of A may be 1.

In one embodiment, the reference parameter includes the ITD parameter of the current frame, the variance of the subband IPD parameterss of the current frame, and the signal type of each of the previous A frames.

If a value of the ITD parameter of the current frame is greater than a third threshold, the variance of the subband IPD parameterss of the current frame is less than a fourth threshold, and the signal type of each of the A frames previous to the current frame is a voice type, the IPD parameter encoding scheme of the current frame is the first encoding scheme in the at least two IPD parameter encoding schemes.

In one embodiment, the first encoding scheme includes any one of the following manners:

a group IPD parameter encoding scheme;

skipping encoding an IPD parameter; or setting a value of an IPD parameter to 0.

In some cases, whether the IPD parameter of the current frame is transmitted to a decoder does not improve a decoding effect. Therefore, the first encoding scheme may be skipping encoding the IPD parameter, setting the value of the IPD parameter to 0, or the group ID parameter encoding scheme. When the first encoding scheme is skipping encoding the IPD parameter, all encoding bits can be used to encode a parameter that can improve a decoding effect. When the first encoding scheme is setting the value of the IPD parameter to 0, or the group ID parameter encoding scheme, because the IPD parameter or a group ID parameter with a value of 0 occupies very few bits, the encoding bits may alternatively be used as many as possible to encode the parameter that can improve the decoding effect, to improve an encoding effect.

In one embodiment, when the first encoding scheme is the group IPD parameter encoding scheme, the processing an IPD parameter of the current frame based on the determined IPD parameter encoding scheme of the current frame includes:

extracting subband IPD parameters of left channel frequency domain signal and right channel frequency domain signal of the current frame;

determining a group IPD parameter of the current frame based on the extracted subband IPD parameters; and encoding the group IPD parameter of the current frame.

In one embodiment, if the IPD parameter encoding scheme of the current frame is not the first encoding scheme, the IPD parameter encoding scheme of the current frame is a second encoding scheme.

The second encoding scheme includes an IPD parameter encoding scheme of a subband set, or a subband IPD parameter encoding scheme, and the subband IPD parameter encoding scheme is encoding subband IPD parameters of some or all of subbands of the current frame.

In one embodiment, the second encoding scheme is the subband IPD parameter encoding scheme.

The processing an IPD parameter of the current frame based on the determined IPD parameter encoding scheme of the current frame includes:

calculating IPD parameters of all or some of subbands of left channel frequency domain signal and right channel frequency domain signal of the current frame; and encoding the IPD parameters that are of all or some of the subbands and that are obtained through calculation.

When the second encoding scheme is encoding the IPD parameters of some of the subbands of the left channel frequency domain signal and right channel frequency domain signal of the current frame, only subband IPD parameters of some subbands that are at a relatively low frequency and that are of the left channel frequency domain signal and right channel frequency domain signal of the current frame may be encoded. In an implementation, IPD parameters of remaining subbands different from a subband at the highest frequency and a subband at the second highest frequency may be encoded. Because the subband IPD parameters different from the subband at the highest frequency and the subband at the second highest frequency does not significantly improve an encoding effect, skipping encoding subband IPD parameters of two subbands can ensure that an encoding bit is used for a parameter that can better improve the encoding effect, to further improve encoding quality.

In one embodiment, the method further includes:

performing encoding based on the determined IPD parameter encoding scheme of the current frame.

For example, an encoding scheme flag bit may be set, and the flag bit occupies one bit, to indicate whether the IPD parameter encoding scheme of the current frame is a first encoding scheme or a second encoding scheme. In this way, a decoder can determine the IPD parameter encoding scheme of the current frame based on the encoding scheme flag bit, to perform decoding by using a corresponding decoding manner.

In one embodiment, before the processing an IPD parameter of the current frame based on the determined IPD parameter encoding scheme of the current frame, the method further includes:

determining whether the determined IPD parameter encoding scheme of the current frame needs to be adjusted;

adjusting the determined IPD parameter encoding scheme of the current frame when it is determined that the determined IPD parameter encoding scheme of the current frame needs to be adjusted.

The processing an IPD parameter of the current frame based on the determined IPD parameter encoding scheme of the current frame includes:

processing the IPD parameter of the current frame based on the adjusted IPD parameter encoding scheme of the current frame.

In one embodiment, the determining whether the determined IPD parameter encoding scheme of the current frame needs to be adjusted is performed based on IPD parameter encoding schemes of the A frames previous to the current frame.

Whether the IPD parameter encoding scheme of the current frame is determined based on the IPD parameter encoding schemes of the A frames previous to the current frame, to ensure a smooth transition between the IPD parameter encoding scheme of the current frame and the IPD parameter encoding schemes of the A frames previous to the current frame, to avoid a sudden change of an encoding effect.

In one embodiment, the parameter indicating the correlation between the left channel and right channel of the current frame is obtained by using the following calculation formula:

$$\text{corr} = \sum_{b=0}^{N} \frac{[E_l(b) + E_r(b) + 2 \times D_r(b)]}{\left[E_l(b) + E_r(b) + 2\sqrt{D_r^2(b) + D_i^2(b)}\right]}, \text{ where}$$

$$E_l(b) = \sum_{k=0}^{L} |L(k)|^2;$$

$$E_r(b) = \sum_{k=0}^{L} |R(k)|^2;$$

$$D_r(b) = \sum_{k=0}^{L} [L_r(k) \times R_r(k) + L_i(k) \times R_i(k)];$$

$$D_i(b) = \sum_{k=0}^{L} [L_i(k) \times R_r(k) -_r (k) \times R_i(k)];$$

$$L(k) = \sum_{n=0}^{Length-1} x_L(n) \times e^{-j\frac{2\pi x n x k}{L}}, 0 \le k < L; \text{ and}$$

$$R(k) = \sum_{n=0}^{Length-1} x_R(n) \times e^{-j\frac{2\pi x n x k}{L}}, 0 \le k < L,$$

where $E_l(b)$ indicates an energy sum of an audio-left channel, $E_r(b)$ indicates an energy sum of an audio-right channel, $L_r(k)$ indicates a real part of a $k^{th}$ frequency value of an audio-left channel frequency domain signal, $R_r(k)$ indicates a real part of a $k^{th}$ frequency value of an audio-right channel frequency domain signal, $L_i(k)$ indicates an imaginary part of the $k^{th}$ frequency value of the audio-left channel frequency domain signal, $R_i(k)$ indicates an imaginary part of the $k^{th}$ frequency value of the audio-right channel frequency domain signal, L indicates a quantity of subband spectral coefficients, and N indicates a quantity of subbands, n indicates an index value of a time domain signal, k indicates an index value of a frequency domain signal, Length indicates a frame length, $x_L(n)$ indicates an audio-left channel time domain signal, $x_R(n)$ indicates an audio-right channel time domain signal, L(k) indicates a $k^{th}$ frequency value that is of the audio-left channel frequency domain signal and that is used to calculate the IPD parameter, and R(k) indicates a $k^{th}$ frequency value that is of the audio-right channel frequency domain signal and that is used to calculate the IPD parameter, where $x_L(n)$ and $x_R(n)$ indicate sequences of real numbers.

In one embodiment, the parameter indicating the correlation between the left channel and right channel of the current frame is obtained by using the following calculation formula:

$$\text{corr} = \sum_{i=0}^{L} \frac{|L(k) + R(k)|^2}{(|L(k)| + |R(k)|)^2}, \text{ where}$$

$$L(k) = \sum_{n=0}^{Length-1} x_L(n) \times e^{-j\frac{2\pi x n x k}{L}}, 0 \le k < L; \text{ and}$$

$$R(k) = \sum_{n=0}^{Length-1} x_R(n) \times e^{-j\frac{2\pi x n x k}{L}}, 0 \le k < L,$$

where

L indicates a quantity of subband spectral coefficients, n indicates an index value of a time domain signal, k indicates an index value of a frequency domain signal, Length indicates a frame length, $x_L(n)$ indicates an audio-left channel time domain signal, and $x_R(n)$ indicates an audio-right channel time domain signal, where $x_L(n)$ and $x_R(n)$ indicate sequences of real numbers.

In one embodiment, the parameter indicating the correlation between the left channel and right channel of the current frame is obtained by using the following calculation formula:

$$\text{corr} = \frac{\left(\sum_{k=1}^{L/2-1} |L(k)R^*(k)|\right)^2}{\sum_{k=1}^{L/2-1} (|L(k)|)^2 \sum_{k=1}^{L/2-1} (|R(k)|)^2}, \text{ where}$$

$$L(k) = \sum_{n=0}^{Length-1} x_L(n) \times e^{-j\frac{2\pi x n x k}{L}}, 0 \le k < L; \text{ and}$$

$$R(k) = \sum_{n=0}^{Length-1} x_R(n) \times e^{-j\frac{2\pi x n x k}{L}}, 0 \le k < L$$

L indicates a quantity of subband spectral coefficients, n indicates an index value of a time domain signal, k indicates an index value of a frequency domain signal, Length indicates a frame length, $x_L(n)$ indicates an audio-left channel time domain signal, and $x_R(n)$ indicates an audio-right channel time domain signal, where $x_L(n)$ and $x_R(n)$ indicate sequences of real numbers. R*(k) indicates a conjugate of R(k). To be specific, R*(k) indicates a conjugate of a $k^{th}$ frequency value of an audio-right channel frequency domain signal.

According to a second aspect of the present disclosure, an IPD difference parameter encoding apparatus is provided and includes:

an obtaining unit, configured to obtain a reference parameter, where the reference parameter is used to determine an IPD parameter encoding scheme of a current frame of a multi-channel signal;

a determining unit, configured to determine the IPD parameter encoding scheme of the current frame based on the reference parameter, where the determined IPD parameter encoding scheme of the current frame is one of at least two preset IPD parameter encoding schemes; and a processing unit, configured to process an IPD parameter of the current frame based on the determined IPD parameter encoding scheme of the current frame.

It can be learned that when the IPD parameter is encoded, the reference parameter is obtained, the IPD parameter encoding scheme of the current frame corresponding to the current frame is determined based on the reference parameter, and the IPD parameter of the current frame is processed by using the determined IPD parameter encoding scheme, so that not only the IPD parameter of the current frame can be adaptively processed, but also processing of the IPD parameter of the current frame matches with the current frame, to improve encoding quality of the multi-channel signal.

In one embodiment, the reference parameter includes at least one of a signal characteristic parameter of the current frame and signal characteristic parameters of A frames previous to the current frame, and A is an integer not less than 1.

The signal characteristic parameter of the current frame includes at least one of a parameter indicating correlation between left channel and right channel of the current frame, a variance of subband IPD parameters of the current frame, a signal type of the current frame, and the ITD parameter of the current frame.

The signal characteristic parameters of the A frames previous to the current frame include at least one of a parameter indicating correlation between left channel and right channel of each of the previous A frames, a variance of subband IPD parameters of each of the previous A frames, an ITD parameter of each of the previous A frames, an IPD parameter encoding scheme of each of the previous A frames, and a signal type of each of the previous A frames.

The signal type includes a voice type or a music type.

It can be learned that, in some cases, when the IPD parameter encoding scheme of the current frame is to be determined, not only the signal characteristic parameter of the current frame is used, but also signal characteristic parameters of the A frames previous to the current frame is used, so that the determined IPD parameter encoding scheme of the current frame not only matches with the current frame but also matches with the A frames previous to the current frame, to ensure continuous continuity of the encoding scheme, and further improve encoding quality.

In one embodiment, the reference parameter includes the parameter indicating the correlation between the left channel and right channel of the current frame.

If a value of the parameter indicating the correlation between the left channel and right channel of the current frame is greater than or equal to a first threshold, the IPD parameter encoding scheme of the current frame is a first encoding scheme in the at least two IPD parameter encoding schemes.

In one embodiment, the first threshold is 0.75.

In one embodiment, the reference parameter includes the IPD parameter encoding scheme of each of the previous A frames and the signal type of each of the previous A frames.

If the IPD parameter encoding scheme of each of the previous A frames is the first encoding scheme in the at least two IPD parameter encoding schemes, and the signal type of each of the previous A frames is a music type, the IPD parameter encoding scheme of the current frame is the first encoding scheme, and the value of A may be 1.

In one embodiment, the reference parameter includes the ITD parameter of the current frame, the variance of the subband IPD parameterss of the current frame, and the signal type of each of the previous A frames.

If a value of the ITD parameter of the current frame is greater than a third threshold, the variance of the subband IPD parameterss of the current frame is less than a fourth threshold, and the signal type of each of the A frames previous to the current frame is a voice type, the IPD parameter encoding scheme of the current frame is the first encoding scheme in the at least two IPD parameter encoding schemes.

In one embodiment, the first encoding scheme includes any one of the following manners:

a group IPD parameter encoding scheme;

skipping encoding an IPD parameter; or setting a value of an IPD parameter to 0.

In some cases, whether the IPD parameter of the current frame is transmitted to a decoder does not improve a decoding effect. Therefore, the first encoding scheme may be skipping encoding the IPD parameter, setting the value of the IPD parameter to 0, or the group ID parameter encoding scheme. When the first encoding scheme is skipping encoding the IPD parameter, all encoding bits can be used to encode a parameter that can improve a decoding effect. When the first encoding scheme is setting the value of the IPD parameter to 0, or the group ID parameter encoding scheme, because the IPD parameter or a group ID parameter with a value of 0 occupies very few bits, the encoding bits may alternatively be used as many as possible to encode the parameter that can improve the decoding effect, to improve an encoding effect.

In one embodiment, if the IPD parameter encoding scheme of the current frame is not the first encoding scheme, the IPD parameter encoding scheme of the current frame is a second encoding scheme.

The second encoding scheme includes an IPD parameter encoding scheme of a subband set, or a subband IPD parameter encoding scheme, and the subband IPD parameter encoding scheme is encoding subband IPD parameters of some or all of subbands of the current frame.

In one embodiment, the second encoding scheme is the subband IPD parameter encoding scheme.

The processing an IPD parameter of the current frame based on the determined IPD parameter encoding scheme of the current frame includes:

calculating IPD parameters of all or some of subbands of left channel frequency domain signal and right channel frequency domain signal of the current frame; and encoding the IPD parameters that are of all or some of the subbands and that are obtained through calculation.

When the second encoding scheme is encoding the IPD parameters of some of the subbands of the left channel frequency domain signal and right channel frequency domain signal of the current frame, only subband IPD parameters of some subbands that are at a relatively low frequency and that are of the left channel frequency domain signal and right channel frequency domain signal of the current frame may be encoded. In an implementation, IPD parameters of remaining subbands different from a subband at the highest frequency and a subband at the second highest frequency may be encoded. Because the subband IPD parameters different from the subband at the highest frequency and the subband at the second highest frequency does not significantly improve an encoding effect, skipping encoding subband IPD parameters of two subbands can ensure that an encoding bit is used for a parameter that can better improve the encoding effect, to further improve encoding quality.

In one embodiment, the apparatus further includes:

an encoding unit, configured to perform encoding based on the determined IPD parameter encoding scheme of the current frame.

For example, an encoding scheme flag bit may be set, and the flag bit occupies one bit, to indicate whether the IPD parameter encoding scheme of the current frame is a first encoding scheme or a second encoding scheme. In this way, a decoder can determine the IPD parameter encoding scheme of the current frame based on the encoding scheme flag bit, to perform decoding by using a corresponding decoding manner.

In one embodiment, the determining unit is further configured to determine whether the IPD parameter encoding scheme that is of the current frame and that is determined by the determining unit needs to be adjusted.

The apparatus further includes:

an adjusting unit, configured to adjust the determined IPD parameter encoding scheme of the current frame when the determining unit determines that the determined IPD parameter encoding scheme of the current frame needs to be adjusted; and the processing unit, further configured to process the IPD parameter of the current frame based on the adjusted IPD parameter encoding scheme of the current frame.

In one embodiment, the determining whether the determined IPD parameter encoding scheme of the current frame needs to be adjusted is performed based on IPD parameter encoding schemes of the A frames previous to the current frame.

Whether the IPD parameter encoding scheme of the current frame is determined based on the IPD parameter encoding schemes of the A frames previous to the current frame, to ensure a smooth transition between the IPD parameter encoding scheme of the current frame and the IPD parameter encoding schemes of the A frames previous to the current frame, to avoid a sudden change of an encoding effect.

In one embodiment, the obtaining unit is specifically configured to obtain, by using the following calculation formula, the parameter indicating the correlation between the left channel and right channel of the current frame:

$$\text{corr} = \sum_{b=0}^{N} \frac{[E_l(b) + E_r(b) + 2 \times D_r(b)]}{\left[E_l(b) + E_r(b) + 2\sqrt{D_r^2(b) + D_i^2(b)}\right]},$$

where $$E_l(b) = \sum_{k=0}^{L} |L(k)|^2;$$

$$E_r(b) = \sum_{k=0}^{L} |R(k)|^2;$$

$$D_r(b) = \sum_{k=0}^{L} [L_r(k) \times R_r(k) + L_i(k) \times R_i(k)];$$

$$D_i(b) = \sum_{k=0}^{L} [L_i(k) \times R_r(k) - L_r(k) \times R_i(k)];$$

$$L(k) = \sum_{n=0}^{Length-1} x_L(n) \times e^{-j\frac{2\pi \times n \times k}{L}}, \ 0 \le k < L;$$

and

-continued $$R(k) = \sum_{n=0}^{Length-1} x_R(n) \times e^{-j\frac{2\pi \times n \times k}{L}}, \ 0 \le k < L.$$

$E_l(b)$ indicates an energy sum of an audio-left channel, $E_r(b)$ indicates an energy sum of an audio-right channel, $L_r(k)$ indicates a real part of a $k^{th}$ frequency value of an audio-left channel frequency domain signal, $R_r(k)$ indicates a real part of a $k^{th}$ frequency value of an audio-right channel frequency domain signal, $L_i(k)$ indicates an imaginary part of the $k^{th}$ frequency value of the audio-left channel frequency domain signal, $R_i(k)$ indicates an imaginary part of the $k^{th}$ frequency value of the audio-right channel frequency domain signal, L indicates a quantity of subband spectral coefficients, and N indicates a quantity of subbands, n indicates an index value of a time domain signal, k indicates an index value of a frequency domain signal, Length indicates a frame length, $x_L(n)$ indicates an audio-left channel time domain signal, $x_R(n)$ indicates an audio-right channel time domain signal, L(k) indicates a $k^{th}$ frequency value that is of the audio-left channel frequency domain signal and that is used to calculate the IPD parameter, and R(k) indicates a $k^{th}$ frequency value that is of the audio-right channel frequency domain signal and that is used to calculate the IPD parameter, where $x_L(n)$ and $x_R(n)$ indicate sequences of real numbers.

In one embodiment, the parameter indicating the correlation between the left channel and right channel of the current frame is obtained by using the following calculation formula:

$$\text{corr} = \sum_{i=0}^{L} \frac{|L(k) + R(k)|^2}{(|L(k)| + |R(k)|)^2},$$

where $$L(k) = \sum_{n=0}^{Length-1} x_L(n) \times e^{-j\frac{2\pi \times n \times k}{L}}, \ 0 \le k < L;$$

and $$R(k) = \sum_{n=0}^{Length-1} x_R(n) \times e^{-j\frac{2\pi \times n \times k}{L}}, \ 0 \le k < L.$$

L indicates a quantity of subband spectral coefficients, n indicates an index value of a time domain signal, k indicates an index value of a frequency domain signal, Length indicates a frame length, $x_L(n)$ indicates an audio-left channel time domain signal, and $x_R(n)$ indicates an audio-right channel time domain signal, where $x_L(n)$ and $x_R(n)$ indicate sequences of real numbers.

In one embodiment, the parameter indicating the correlation between the left channel and right channel of the current frame is obtained by using the following calculation formula:

$$\text{corr} = \frac{\left(\sum_{k=1}^{L/2-1} |L(k)R^*(k)|\right)^2}{\sum_{k=1}^{L/2-1} (|L(k)|)^2 \sum_{k=1}^{L/2-1} (|R(k)|)^2},$$

where

-continued $$L(k)=\sum_{n=0}^{Length-1} x_L(n)\times e^{-j\frac{2\pi\times n\times k}{L}},\ 0\le k<L;$$

and $$R(k)=\sum_{n=0}^{Length-1} x_R(n)\times e^{-j\frac{2\pi\times n\times k}{L}},\ 0\le k<L.$$

L indicates a quantity of subband spectral coefficients, n indicates an index value of a time domain signal, k indicates an index value of a frequency domain signal, Length indicates a frame length, $x_L(n)$ indicates an audio-left channel time domain signal, and $x_R(n)$ indicates an audio-right channel time domain signal, where $x_L(n)$ and $x_R(n)$ indicate sequences of real numbers. R*(k) indicates a conjugate of R(k). To be specific, R*(k) indicates a conjugate of a $k^{th}$ frequency value of an audio-right channel frequency domain signal.

According to a third aspect of the present disclosure, a terminal is provided and includes a memory and a processor.

The memory is configured to store a group of executable code.

The processor is configured to execute the executable code stored in the memory to perform any one of the first aspect or the first implementation to the thirteenth implementation of the first aspect.

A fourth aspect of the present disclosure provides a storage medium. The storage medium stores executable code. When the executable code is executed, any one of the first aspect or the first implementation to the thirteenth implementation of the first aspect may be performed.

According to a fifth aspect of the present disclosure, a computer program is provided. The computer program may perform any one of the first aspect or the first implementation to the thirteenth implementation of the first aspect.

When the IPD parameter is encoded in the embodiments of the present disclosure, the reference parameter is obtained, the IPD parameter encoding scheme of the current frame corresponding to the current frame is determined based on the reference parameter, and the IPD parameter of the current frame is processed by using the determined IPD parameter encoding scheme, so that not only the IPD parameter of the current frame can be adaptively processed, but also processing of the IPD parameter of the current frame matches with the current frame, to improve encoding quality of the multi-channel signal.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
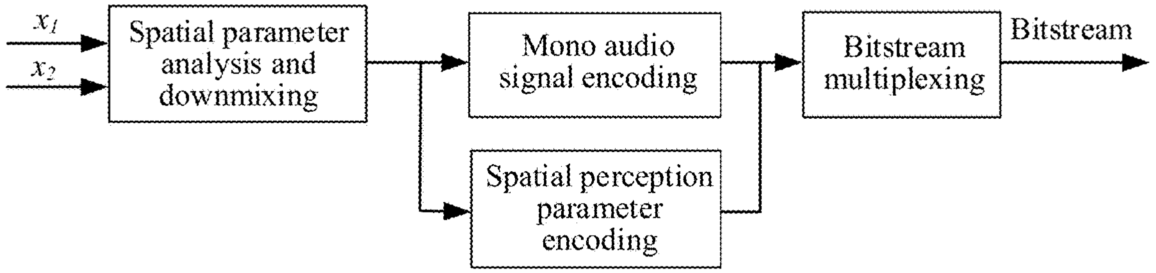
FIG. 1 is a schematic principle diagram of PS encoding.

FIG. 1 is a schematic principle diagram of PS encoding.

In PS encoding, an encoder downmixes a stereo signal input from a multi-channel (for example, an x1 channel and an x2 channel) into a mono audio signal, extracts spatial perception parameters of the stereo signal through spatial perception parameter analysis, obtains a mono audio bitstream through mono audio signal encoding, and obtains a spatial perception parameter bitstream through spatial perception parameter encoding. Further, the encoder performs bitstream multiplexing on the mono audio bitstream and the spatial perception parameter bitstream to obtain a bitstream for stereo signal encoding.

Figure 2:
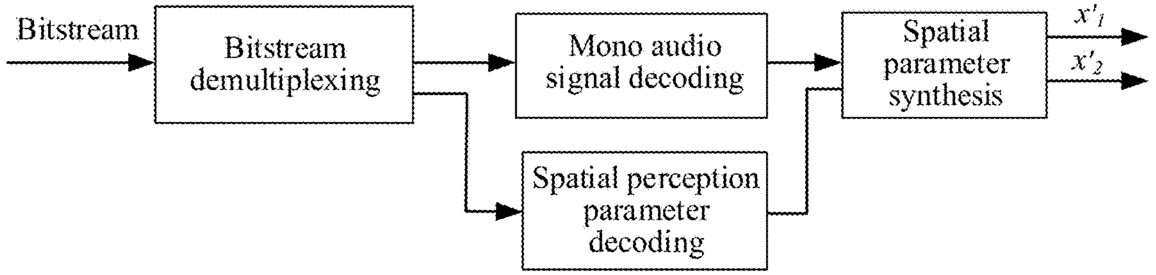
FIG. 2 is a schematic principle diagram of PS decoding.

FIG. 2 is a schematic principle diagram of PS decoding.

A decoder performs bitstream demultiplexing on a bitstream for stereo signal encoding to obtain a mono audio bitstream and a spatial perception parameter bitstream, performs mono audio signal decoding on the mono audio bitstream, and performs spatial perception parameter decoding on the spatial perception parameter bitstream. Further, after decoding a mono audio signal, the decoder synthesizes a reconstructed stereo signal by using the spatial perception parameters.

In one embodiment, the spatial perception parameters in the foregoing PS encoding and PS decoding include parameters such as IC, an ILD, an ITD, and an IPD. The IC describes an inter-channel correlation or correlation. This parameter determines perception of a sound field range, and can improve a sense of space and sound stability of an audio signal. An ILD parameter is used to distinguish between horizontal direction angles of stereo sources and describes an inter-channel intensity difference. This parameter affects frequency components of an entire spectrum. An ITD parameter and an IPD parameter are spatial perception parameters that indicate horizontal orientation of an acoustic source. The ILD parameter, the ITD parameter, and the IPD parameter determine human ears' perception of a location of a sound source, and can effectively determine a sound field location and is important for stereo signal restoration. Therefore, determining of parameters such as the IPD parameter is important for stereo signal restoration.

Figure 3:
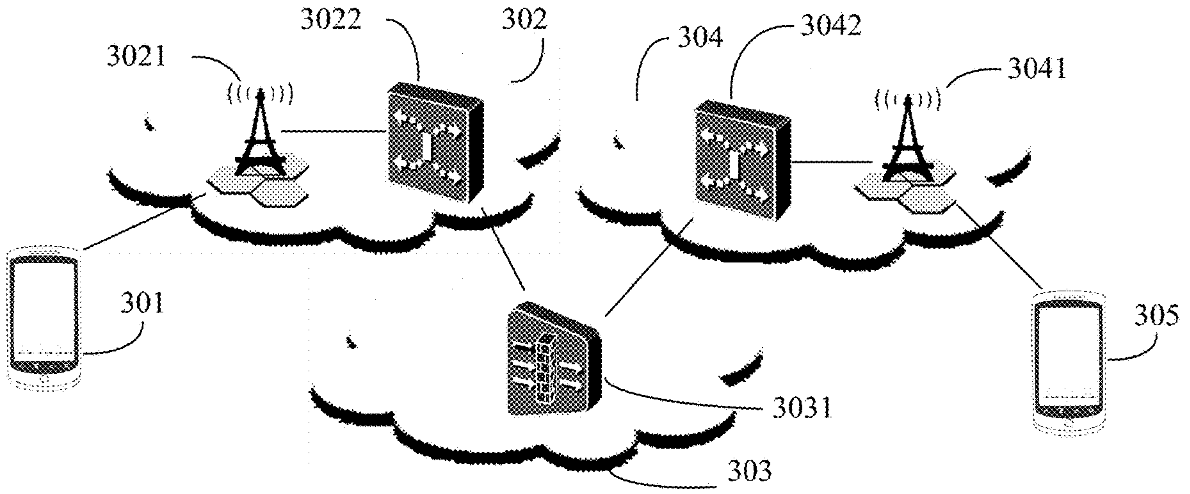
FIG. 3 is a schematic diagram of an application scenario of a solution of the present disclosure according to an embodiment of the present disclosure.

An application scenario of a solution of the present disclosure is shown in FIG. 3. After encoding (including encoding an IPD parameter) a collected multi-channel signal, a terminal 301 sends a code stream obtained through encoding to a radio access network (RAN) 302, for example, may directly send the code stream to a based station 3021 in the RAN 302. After passing through the based station 3021, the code stream is transmitted to a packet data network gateway (PGW) 3022. After passing through the PGW 3022, the code stream is transmitted to a core network 303, and specifically, the code stream may pass through a session border controller (SBC) 3031 in the core network 303. The code stream passing through the core network 303 enters a RAN 304. The RAN 304 includes a PGW 3042 and a base station 3041. After the code stream passes through the PGW 3042 and arrives at the base station 3041, the base station 3041 sends the code stream to a terminal 305, and the terminal 305 decodes the code stream and plays a multi-channel signal obtained through decoding.

It should be noted that, in the foregoing description, the RAN merely includes an example of two network elements (e.g., the base station and the PGW). During actual implementation, the RAN further includes a plurality of other network elements. For ease of description, another network element is omitted in the embodiments of the present disclosure. Similarly, the core network also merely includes an example of the SBC. For ease of description, another network element is omitted in the embodiments of the present disclosure. It may be understood that network elements in the foregoing network are merely examples, and names of the network elements may be different in different networks. For example, the PGW is referred to as an evolved packet data gateway (ePDG) in an LTE network. Similarly, a connection manner between the foregoing network elements may also change with evolution of a network. Therefore, in the embodiments of the present disclosure, an application scenario of the present disclosure is not limited to the foregoing examples.

The terminal 301 and the terminal 305 are terminals that have a cellular network access capability, and may be a wearable device, a virtual reality (VR) device, an augmented reality (AR) device, a mobile phone, a tablet computer (Pad), a notebook computer (NB), a personal computer (PC), or the like.

Figure 4:
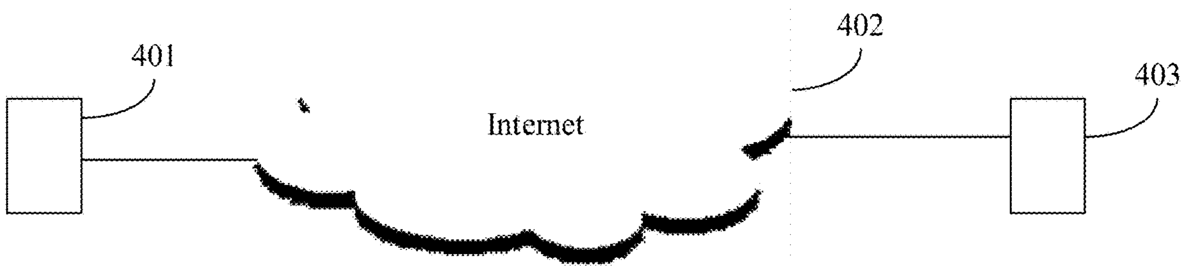
FIG. 4 is a schematic diagram of another application scenario of a solution of the present disclosure according to an embodiment of the present disclosure.

Another application scenario of a solution of the present disclosure is shown in FIG. 4. After encoding (including encoding an IPD parameter) a collected multi-channel signal, a terminal 401 sends the code stream obtained through encoding to a terminal 403 over an Internet 402. The terminal 403 decodes the code stream and plays a multi-channel signal obtained through decoding.

The terminal 401 and the terminal 403 are terminals having an Internet access capability, and may be wearable devices, VR devices, AR devices, mobile phones, Pads, NBs, PCs, or the like.

Figure 5:
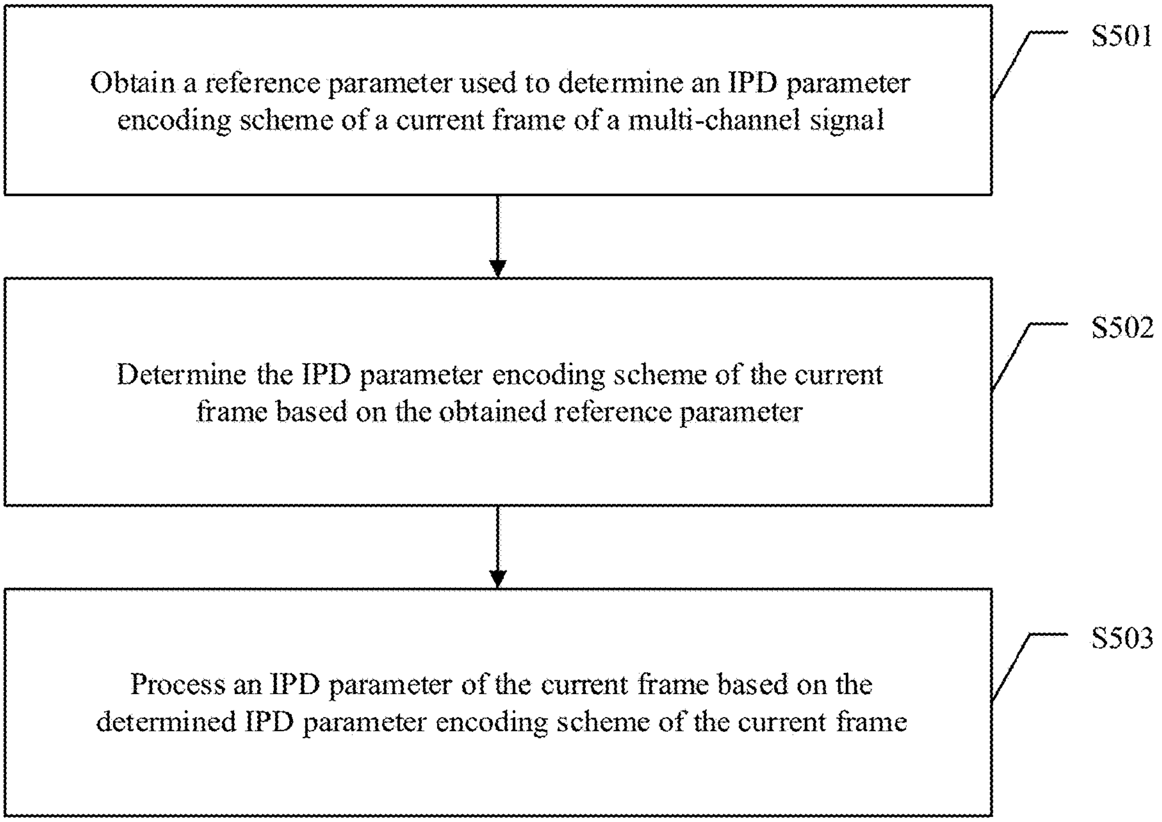
FIG. 5 is a schematic flowchart of an IPD parameter encoding method according to an embodiment of the present disclosure.

FIG. 5 is a schematic flowchart of an IPD parameter encoding method according to an embodiment of the present disclosure. The method includes the following operations.

Operation S501. Obtain a reference parameter used to determine an IPD parameter encoding scheme of a current frame of a multi-channel signal.

During specific implementation, according to one embodiment, the IPD parameter encoding method provided in this embodiment of the present disclosure may be performed by an encoder that can encode the multi-channel signal. After encoding an IPD parameter of the current frame by using the IPD parameter encoding method provided in this embodiment of the present disclosure, the encoder transmits the encoded IPD parameter. A decoder uses, for stereo synthesis processing, the IPD parameter obtained through decoding. The following describes in detail the IPD parameter encoding method provided in this embodiment of the present disclosure. It should be noted that the encoder and the decoder in this embodiment of the present disclosure are merely described in terms of a function, and actual forms of the encoder and the decoder may be the foregoing terminals. It may be understood that, in a call process, the terminal may have a function of both an encoder and a decoder. For ease of description, the current frame is directly used when the current frame of the multi-channel signal is subsequently described. The multi-channel signal in this embodiment of the present disclosure may be a dual-channel signal, a three-channel signal, a four-channel signal, or the like. A specific quantity of channels corresponding to the multi-channel signal is not limited in this embodiment of the present disclosure.

In one embodiment, when encoding the IPD parameter of the current frame, the encoder may first obtain the reference parameter used to determine the IPD parameter encoding scheme of the current frame, and then determine the IPD parameter encoding scheme of the current frame based on the reference parameter. In other words, the reference parameter is used to determine the IPD parameter encoding scheme of the current frame. It may be understood that the reference parameter may alternatively be used to determine an encoding scheme for another parameter of the current frame. In this embodiment of the present disclosure, the reference parameter is not limited to being used to determine the IPD parameter encoding scheme. During specific implementation, the reference parameter may include at least one of a signal characteristic parameter of the current frame and signal characteristic parameters of A frames previous to the current frame. To be specific, the reference parameter may include the signal characteristic parameter of the current frame, the signal characteristic parameters of the A frames previous to the current frame, the signal characteristic parameter of the current frame and the signal characteristic parameters of the A frames previous to the current frame, or the like, and may specifically be determined based on an actual application scenario. This is not limited herein. Herein, A is an integer not less than 1. To be specific, the A frames previous to the current frame may be one frame, two frames, three frames, or the like previous to the current frame. This is not limited herein. The frame previous to the current frame and the current frame are consecutive in a time sequence. The two frames previous to the current frame are consecutive in a time sequence and include the frame previous to the current frame. The three frames previous to the current frame are consecutive in a time sequence and include the two frames previous to the current frame.

During specific implementation, according to one embodiment, the signal characteristic parameter of the current frame may include one or more of parameters such as a parameter indicating correlation between left channel and right channel of the current frame, a variance of subband IPD parameters of the current frame, a signal type of the current frame, and an ITD parameter of the current frame. The parameter indicating the correlation between the left channel and right channel of the current frame, and the variance of the subband IPD parameterss of the current frame may be obtained through calculation based on left channel frequency domain signal and right channel frequency domain signal of the multi-channel signals. The ITD parameter of the current frame may be determined based on a manner of extracting an ITD parameter of the multi-channel signal of the current frame. The manner of extracting the ITD parameter of the current frame may include an extraction manner provided in a standard protocol or an extraction manner known to a person skilled in the art. This is not limited herein.

The signal characteristic parameters of the A frames prior to the current frame (referred to herein as "previous A frames") include one or more of parameters such as a parameter indicating correlation between left channel and right channel of each of the A frames previous to the current frame, a variance of subband IPD parameters of each of the A frames previous to the current frame, an ITD parameter of each of the A frames previous to the current frame, an IPD parameter encoding scheme of each of the A frames previous to the current frame, and a signal type of each of the A frames previous to the current frame. Selection of a specific parameter or specific parameters may be determined based on an actual application scenario. This is not limited herein. The IPD parameter encoding scheme of each of the A frames previous to the current frame may be stored in a cache or a memory. The signal type may include a voice type or a music type. The signal characteristic parameters of the A frames previous to the current frame may be stored in a cache. It may be understood that, after the signal characteristic parameter of the current frame is obtained, the signal characteristic parameter of the current frame is also stored in the cache to determine an IPD parameter encoding scheme of a following frame.

In one embodiment, the encoder may perform time-frequency transformation on left channel and right channel time domain signals of the multi-channel signal of the current frame to obtain the left channel frequency domain signal and right channel frequency domain signal of the current frame. Specifically, the foregoing time-frequency transformation may be implemented by using an implementation such as fast fourier transformation (Fast Fourier Transformation, FFT) or modified discrete cosine transform (Modified Discrete Cosine Transform, MDCT). This is not limited herein. The time-frequency transformation performed on the left channel and right channel time domain signals of the multi-channel signal of the current frame may be performed in a form of a frame or in a form of a subframe. One frame may usually include four subframes, two subframes, or eight subframes. A specific quantity of subframes may be determined based on a specific situation.

For example, in one embodiment, when the encoder transforms the left channel and right channel time domain signals of the multi-channel signal of the current frame into the left channel frequency domain signal and right channel frequency domain signal through the FFT, the following transformation formulas may specifically be used:

$$R(k) = \sum_{n=0}^{Length-1} x_R(n) \times e^{-j\frac{2\pi \times n \times k}{L}},\ 0 \le k < M$$

and $$L(k) = \sum_{n=0}^{Length-1} x_L(n) \times e^{-j\frac{2\pi \times n \times k}{L}},\ 0 \le k < M.$$

Herein, n indicates an index value of a time domain signal, k indicates an index value of a frequency domain signal, Length indicates a frame length, M indicates a time-frequency transformation length for transforming a time domain signal into a frequency domain signal, $x_L(n)$ indicates an audio-left channel time domain signal, $x_R(n)$ indicates an audio-right channel time domain signal, L(k) indicates a $k^{th}$ frequency value that is of an audio-left channel frequency domain signal and that is used to calculate the IPD parameter, and R(k) indicates a $k^{th}$ frequency value that is of an audio-right channel frequency domain signal and that is used to calculate the IPD parameter, where, $x_L(n)$ and $x_R(n)$ indicate sequences of real numbers.

A fourier transformation coefficient X(k) of a sequence of real numbers x(n) (including $x_L(n)$ and $x_R(n)$) is a complex number, and a real part of the sequence of real numbers x(n) has an even symmetry and an imaginary part has an odd symmetry. To be specific, X(k) has a conjugate symmetry. Both X(0) and X(N/2) are real numbers and meet the following relationship formula:

$$X(k) = X^*(N-k),$$

where $$1 \le k \le L/2 - 1.$$

When discrete fourier transformation is performed, by using this conjugate symmetry, the encoder does not need to calculate and store X(k), L/2+1≤k≤L−1, and imaginary parts of X(0) and X(L/2), but only needs to calculate X(0) to X(L/2), to reduce occupation of a computing resource and a storage resource of the encoder.

After transforming the left channel and right channel time domain signals of the current frame into the left channel frequency domain signal and right channel frequency domain signal in a form of a frame or a subframe, the encoder may calculate, based on the left channel frequency domain signal and right channel frequency domain signal, the parameter indicating the correlation between the left channel and right channel of the current frame.

In one embodiment, the parameter indicating the correlation between the left channel and right channel of the current frame may be obtained through calculation by using the following calculation formula:

$$\text{corr} = \sum_{b=0}^{N} \frac{[E_l(b) + E_r(b) + 2 \times D_r(b)]}{\left[E_l(b) + E_r(b) + 2\sqrt{D_r^2(b) + D_i^2(b)}\right]},$$

where, $$E_l(b) = \sum_{k=0}^{L} |L(k)|^2,$$

$$E_r(b) = \sum_{k=0}^{L} |R(k)|^2,$$

$$D_r(b) = \sum_{k=0}^{L} [L_r(k) \times R_r(k) + L_i(k) \times R_i(k)],$$

and $$D_i(b) = \sum_{k=0}^{L} [L_i(k) \times R_r(k) - L_r(k) \times R_i(k)].$$

$E_l(b)$ indicates an energy sum of an audio-left channel, $E_r(b)$ indicates an energy sum of an audio-right channel, $L_r(k)$ indicates a real part of a $k^{th}$ frequency value of an audio-left channel frequency domain signal, $R_r(k)$ indicates a real part of a $k^{th}$ frequency value of an audio-right channel frequency domain signal, $L_i(k)$ indicates an imaginary part of a $k^{th}$ frequency value of the audio-left channel frequency domain signal, $R_i(k)$ indicates an imaginary part of a $k^{th}$ frequency value of the audio-right channel frequency domain signal, L indicates a quantity of subband spectral coefficients, and N indicates a quantity of subbands.

In another implementation, the parameter indicating the correlation between the left channel and right channel of the current frame may be obtained through calculation by using the following calculation formula:

$$\mathrm{corr} = \sum_{i=0}^{L} \frac{|L(k) + R(k)|^2}{(|L(k)| + |R(k)|)^2}.$$

In another embodiment, the parameter indicating the correlation between the left channel and right channel of the current frame may be obtained through calculation by using the following calculation formula:

$$\mathrm{corr} = \frac{\left(\sum_{k=1}^{L/2-1} |L(k)R^*(k)|\right)^2}{\sum_{k=1}^{L/2-1} (|L(k)|)^2 \sum_{k=1}^{L/2-1} (|R(k)|)^2}.$$

Herein, $R^*(k)$ indicates a conjugate of $R(k)$. To be specific, $R^*(k)$ indicates a conjugate of the $k^{th}$ frequency value of the audio-right channel frequency domain signal.

In some feasible implementations, after transforming the left channel and right channel time domain signals of the current frame into the left channel frequency domain signal and right channel frequency domain signal, the encoder may further calculate the variance of the subband IPD parameterss of the current frame based on the left channel frequency domain signal and right channel frequency domain signal. Specifically, the encoder may first divide the left channel frequency domain signal and right channel frequency domain signal of the current frame into at least two subbands (in other words, a plurality of subbands). It is assumed that the left channel frequency domain signal and right channel frequency domain signal are divided into Nsubband subbands, Nsubband where is an integer greater than 2. Then, the encoder may calculate IPD parameters of all subbands based on frequency domain signals of the Nsubband subbands obtained through division, and calculate the variance of the subband IPD parameterss of the current frame based on the IPD parameters of the Nsubband subbands obtained through calculation.

In an implementation, the encoder may specifically calculate the subband IPD parameter by using the following calculation formula:

$$IPD(b) = \arg\left(\sum_{k=A_{b-1}}^{A_b-1} L(k)R^*(k)\right), \; 0 \le b < N_{subband}.$$

Herein, b indicates an index value of a subband, and a frequency included in a subband b is $A_{b-1} \le k \le A_b - 1$.

In an implementation, the encoder may calculate the variance of the subband IPD parameterss by using the following calculation formula:

$$\mathrm{var} = \frac{1}{N_{subband}}, \sum_{b=0}^{N_{subband}-1} (IPD(b) - avr)^2,$$

where $$avr = \frac{1}{N_{subband}} \sum_{b=0}^{N_{subband}-1} IPD(b).$$

In another embodiment of the present disclosure, the subband IPD parameter may be obtained through calculation by using the following calculation formula:

$$IPD(b) = \mathrm{atan2}\left(\frac{D_i(b)}{D_r(b)}\right).$$

Herein, a tan 2 indicates an arctan function.

It may be understood that, during actual application, the subband IPD parameter may alternatively be obtained through calculation in another manner. A specific calculation manner of the subband IPD parameter is not limited in this embodiment of the present disclosure.

S502. Determine the IPD parameter encoding scheme of the current frame based on the obtained reference parameter.

During specific implementation, in one embodiment, the encoder may adaptively select, based on the obtained reference parameter, one of a plurality of preset IPD parameter encoding schemes as the IPD parameter encoding scheme of the current frame.

The plurality of preset IPD parameter encoding schemes may include a first encoding scheme and a second encoding scheme. The first encoding scheme includes a group IPD parameter encoding scheme, skipping encoding an IPD parameter, setting a value of the IPD parameter to 0, or the like. The second encoding scheme includes an IPD parameter encoding scheme of a subband set, a subband IPD parameter encoding scheme, or the like. The subband IPD parameter encoding scheme may be encoding IPD parameters of all or some of subbands of the left channel frequency domain signal and right channel frequency domain signal of the current frame.

It may be understood that, in one embodiment, it may be predetermined that the first encoding scheme is specifically one of the following: the group IPD parameter encoding scheme, skipping encoding the IPD parameter, and setting the value of the IPD parameter to 0. Therefore, the encoder may directly determine that an encoding scheme is the group IPD parameter encoding scheme, skipping encoding the IPD parameter, or setting the value of the IPD parameter to 0, and does not need to perform selection from three encoding schemes. Correspondingly, it may further be predetermined that the second encoding scheme is specifically one of the IPD parameter encoding scheme of the subband set and the subband IPD parameter encoding scheme. Therefore, the encoder may directly determine that an encoding scheme is the IPD parameter encoding scheme of the subband set or the subband IPD parameter encoding scheme, and does not need to perform selection from two encoding schemes.

In another embodiment, the encoder may first determine the first encoding scheme or the second encoding scheme. When determining the first encoding scheme, the encoder selects one of the foregoing three encoding schemes. Correspondingly, when determining the second encoding scheme, the encoder selects one of the foregoing two second encoding schemes.

In one embodiment, after the IPD parameter encoding scheme of the current frame is determined, the determined IPD parameter encoding scheme of the current frame may be encoded. A specific encoding scheme may be setting a preset parameter as a preset value, and indicating different encoding schemes by using different values. For example, in an implementation, the IPD parameter encoding scheme of the current frame may be indicated by using an encoding scheme flag bit. The flag bit may occupy one bit. When a value of this bit is 0, it indicates that the IPD parameter encoding scheme of the current frame is the first encoding scheme. When a value of this bit is 1, it indicates that the IPD parameter encoding scheme of the current frame is the second encoding scheme. Certainly, when a value of this bit is 1, it may alternatively indicate that the IPD parameter encoding scheme of the current frame is the first encoding scheme, and when a value of this bit is 0, it may alternatively indicate that the IPD parameter encoding scheme of the current frame is the second encoding scheme. The decoder may determine the IPD parameter encoding scheme based on the value of the flag bit, to determine a corresponding decoding manner.

Operation S503. Process an IPD parameter of the current frame based on the determined IPD parameter encoding scheme of the current frame.

In one embodiment, the reference parameter includes the parameter indicating the correlation between the left channel and right channel of the current frame. In this case, when the IPD parameter encoding scheme of the current frame is to be determined, the parameter indicating the correlation between the left channel and right channel of the current frame may be compared with a predefined first threshold. If a value of the parameter indicating the correlation between the left channel and right channel of the current frame is greater than or equal to the first threshold, the IPD parameter encoding scheme of the current frame is the first encoding scheme. On the contrary, if a value of the parameter indicating the correlation between the left channel and right channel of the current frame is less than the first threshold, the IPD parameter encoding scheme of the current frame is the second encoding scheme. A value of the predefined first threshold ranges from 0.6 to 0.95. For example, the value may specifically be 0.89, 0.8, 0.75, or the like.

In one embodiment, the reference parameter includes the variance of the subband IPD parameterss of the current frame. In this case, when the IPD parameter encoding scheme of the current frame is to be determined, the variance of the subband IPD parameterss of the current frame may be compared with a predefined second threshold. If a value of the parameter indicating the correlation between the left channel and right channel of the current frame is less than the second threshold, it indicates that the IPD parameter encoding scheme of the current frame is the first encoding scheme. On the contrary, if a value of the parameter indicating the correlation between the left channel and right channel of the current frame is greater than or equal to the second threshold, it indicates that the IPD parameter encoding scheme of the current frame is the second encoding scheme. A value of the predefined second threshold ranges from 0.05 to 0.5. For example, the value may specifically be 0.45, 0.25, 0.3, or the like.

In one embodiment, the reference parameter includes the signal type of the current frame. For example, in an implementation, when the signal type of the current frame is a voice type, it may be determined that the IPD parameter encoding scheme of the current frame is the second encoding scheme. When the signal type of the current frame is a music type, it may be determined that the IPD parameter encoding scheme of the current frame is a first IPD parameter encoding scheme. It may be understood that, in some other embodiments, the signal type of the current frame is not the only reference parameter for determining the IPD parameter encoding scheme of the current frame. The IPD parameter encoding scheme may further be determined with reference to another reference parameter.

In one embodiment, the reference parameter includes an ITD parameter of the current frame. If a value of the ITD parameter of the current frame is greater than a preset threshold, it is determined that the IPD parameter encoding scheme of the current frame is the first encoding scheme. Otherwise, the IPD parameter encoding scheme of the current frame is the second encoding scheme. In an embodiment, the preset threshold may be 1, 2, 3, 4, or 5.

It may be understood that the signal characteristic parameter of the current frame may include only one of the foregoing parameters. In this case, the IPD parameter encoding scheme of the current frame may be determined provided that the parameter meets a corresponding parameter condition. Certainly, the signal characteristic parameter of the current frame may alternatively include at least two of the foregoing parameters. In this case, the IPD parameter encoding scheme of the current frame may be determined only when the at least two parameters respectively meet corresponding parameter conditions.

In one embodiment, the reference parameter includes the IPD parameter encoding scheme of each of the A frames previous to the current frame and the signal type of each of the A frames previous to the current frame. In this case, it may be determined whether the IPD parameter encoding scheme of each of the A frames previous to the current frame is a preset IPD parameter encoding scheme and whether the signal type of each of the A frames previous to the current frame is a preset signal type. If the IPD parameter encoding scheme of each of the A frames previous to the current frame is the first encoding scheme, and the signal type of each of the A frames of the current frame is a music type, the IPD parameter encoding scheme of the current frame may be determined as the first encoding scheme.

For example, when A=1, the A frames previous to the current frame are one frame previous to the current frame. If the IPD parameter encoding scheme of the frame previous to the current frame is the first encoding scheme, and the signal type of the frame previous to the current frame is a music type, the IPD parameter encoding scheme of the current frame may be determined as the first encoding scheme. Otherwise, it is determined that the IPD parameter encoding scheme of the current frame is not the first encoding scheme, for example, the second encoding scheme.

When A=2, the A frames previous to the current frame are two frames previous to the current frame. If IPD parameter encoding schemes of the two frames previous to the current frame both are first encoding schemes, and signal types of the two frames previous to the current frame are music types, the IPD parameter encoding scheme of the current frame may be determined as the first encoding scheme. Otherwise, it is determined that the IPD parameter encoding scheme of the current frame is not the first encoding scheme, for example, the second encoding scheme.

In one embodiment, the reference parameter includes the ITD parameter of the current frame, the variance of the subband IPD parameterss of the current frame, and the signal type of each of the A frames previous to the current frame. In this case, an absolute value of the ITD parameter of the current frame may be compared with a predefined third threshold, the variance of the subband IPD parameterss of the current frame is compared with a predefined fourth threshold, and it is determined whether the signal type of each of the A frames previous to the current frame is a voice type. A value of the predefined third threshold may range from 0 to 4. For example, the value of the third threshold may be 4, 2, 0, or the like. A value of the predefined fourth threshold may range from 0.05 to 0.4. The value of the fourth threshold may be 0.4, 0.35, 0.25, 0.05, or the like. If the absolute value of the ITD parameter of the current frame is greater than the third threshold, the variance of the subband IPD parameters of the current frame is less than the fourth threshold, and the signal type of each of the A frames previous to the current frame is a voice type, the IPD parameter encoding scheme of the current frame may be determined as the first encoding scheme. Otherwise, it is determined that the IPD parameter encoding scheme of the current frame is not the first encoding scheme, for example, the second encoding scheme.

If the A frames previous to the current frames are the frame previous to the current frame, when the absolute value of the ITD parameter of the current frame is greater than the third threshold, the variance of the subband IPD parameters of the current frame is less than the fourth threshold, and the signal type of the frame previous to the current frame is a voice type, the IPD parameter encoding scheme of the current frame may be determined as the first encoding scheme. If the A frames previous to the current frames are the two frames previous to the current frame, when the absolute value of the ITD parameter of the current frame is greater than the third threshold, the variance of the subband IPD parameters of the current frame is less than the fourth threshold, and a signal type of each of the two frames previous to the current frame is a voice type, the IPD parameter encoding scheme of the current frame may be determined as the first encoding scheme.

In one embodiment, after determining that the IPD parameter encoding scheme of the current frame is the first encoding scheme, the encoder may process the IPD parameter of the current frame based on the first encoding scheme. For example, if the first encoding scheme is skipping encoding the IPD parameter, no operation is performed, to be specific, ending a process corresponding to encoding of the IPD parameter of the current frame. If the first encoding scheme is the group IPD parameter encoding scheme, the group IPD parameter of the current frame may be encoded. The group IPD parameter of the current frame is used as the IPD parameter of the current frame. If the first encoding scheme is setting the value of the IPD parameter to 0, the value of the IPD parameter of the current frame may be set to 0, and then the IPD parameter with a value of 0 is subsequently processed. For example, if the value of the IPD parameter is required as an input during some processing, after the value of the IPD parameter of the current frame is set to 0, 0 may be used as the input of the processing.

In one embodiment, the reference parameter includes the parameter indicating the correlation between the left channel and right channel of the current frame, and may further include the IPD parameter encoding scheme of the frame previous to the current frame and the signal type of the previous frame. If the value of the parameter indicating the correlation between the left channel and right channel of the current frame is greater than or equal to the first threshold, it may be determined that the IPD parameter encoding scheme of the current frame is the first encoding scheme. If the value of the parameter indicating the correlation between the left channel and right channel of the current frame is less than the first threshold, and the IPD parameter encoding scheme of the frame previous to the current frame is the first encoding scheme and the signal type of the previous frame is a music signal type, it may also be determined that the IPD parameter encoding scheme of the current frame is the first encoding scheme. Otherwise, if the value of the parameter indicating the correlation between the left channel and right channel of the current frame is less than the first threshold, and the IPD parameter encoding scheme of the frame previous to the current frame is the second encoding scheme or the signal type of the frame previous to the current frame is a voice type, it is determined that the IPD parameter encoding scheme of the current frame is the second encoding scheme.

Further, in one embodiment, after the IPD parameter encoding scheme of the current frame is determined by using the foregoing implementation, whether to adjust the IPD parameter encoding scheme of the current frame may further be determined based on the IPD parameter encoding schemes of the A frames previous to the current frame. For example, whether to adjust the IPD parameter encoding scheme of the current frame may be determined based on the IPD parameter encoding scheme of the frame, two frames, three frames, four frames, or five frames previous to the current frame. In a possible implementation, if the IPD parameter encoding scheme of the current frame is the same as the IPD parameter encoding scheme of the previous A frames, the IPD parameter encoding scheme of the current frame does not need to be adjusted. If the IPD parameter encoding scheme of the current frame is different from the IPD parameter encoding scheme of the previous A frames, adjusting the IPD parameter encoding scheme of the current frame may be considered. For example, the two frames, three frames, four frames, or five frames previous to the current frame, including the frame previous to the current frame use a same IPD parameter encoding scheme. In addition, when the IPD parameter encoding scheme used by the two frames, three frames, four frames, or five frames previous to the current frame is different from the IPD parameter encoding scheme of the current frame, the IPD parameter encoding scheme of the current frame may be adjusted. To be specific, the IPD parameter encoding scheme of the current frame is adjusted to be the same as the IPD parameter encoding scheme of the previous A frames. Adjusting the IPD parameter encoding scheme of the current frame may ensure that an encoding scheme of the current frame is kept consistent with that of a previous frame to some extent, so that an encoded code stream can ensure a smooth transition between the previous frame and the current frame during decoding, and auditory perception is better.

In one embodiment, the encoder may extract IPD parameters of at least some subbands of the left channel frequency domain signal and right channel frequency domain signal of the current frame when the encoding scheme is the second encoding scheme. The at least some subbands of the left channel frequency domain signal and right channel frequency domain signal of the current frame may specifically include all or some of the Nsubband subbands obtained through division of the left channel frequency domain signal and right channel frequency domain signal of the current frame. This is not limited herein. During specific implementation, a user may determine, based on encoding requirements such as an encoding rate or encoding quality of multi-channel signal encoding, that a frequency domain range of the left channel frequency domain signal and right channel frequency domain signal that are of the current frame and that are used to encode the group IPD parameter of the current frame includes an entire frequency domain range of the left channel frequency domain signal and right channel frequency domain signal of the current frame, to be specific, frequency domain signals of all subbands in the left channel frequency domain signal and right channel frequency domain signal of the current frame, or includes a specific frequency domain range of the left channel frequency domain signal and right channel frequency domain signal of the current frame, to be specific, frequency domain signals of some frames in the left channel frequency domain signal and right channel frequency domain signal of the current frame. The frequency domain signals of some of the frames in the left channel frequency domain signal and right channel frequency domain signal of the current frame are included in the frequency domain signals of some of the subbands of the left channel frequency domain signal and right channel frequency domain signal.

In one embodiment, the encoder may not first extract IPD parameters of all or some of subbands of the left channel frequency domain signal and right channel frequency domain signal of the current frame, and then determine the IPD parameter encoding scheme of the current frame. If the first encoding scheme is skipping encoding the IPD parameter of the current frame, the IPD parameters of all or some of the subbands of the left channel frequency domain signal and right channel frequency domain signal of the current frame may not be directly extracted. In some other implementations, an IPD parameter of each of all or some of the subbands of the left channel frequency domain signal and right channel frequency domain signal of the current frame may alternatively first be extracted, and then the IPD parameter encoding scheme of the current frame is determined.

In one embodiment, if the encoder determines that the frequency domain range of the left channel frequency domain signal and right channel frequency domain signal that are of the current frame and that are used to encode the group IPD parameters of the left channel frequency domain signal and right channel frequency domain signal of the current frame is an entire frequency domain range of the left channel frequency domain signal and right channel frequency domain signal of the current frame, an IPD parameter of each of all subbands (to be specific, the Nsubband subbands of the current frame) of the left channel frequency domain signal and right channel frequency domain signal of the current frame may be extracted, an average value of IPD parameters of all extracted subbands may be calculated, and then the obtained average value of the IPD parameters of all of the subbands is used as the group IPD parameter of the current frame. In an implementation, a formula for calculating the group IPD parameter of the current frame is as follows:

$$G\_IPD = \frac{1}{N_{subband}} \sum_{b=0}^{N_{subband}-1} IPD(b).$$

G_IPD indicates the group IPD parameter of the current frame, and IPD(b) indicates an IPD parameter of a $b^{th}$ subband.

In one embodiment, if the encoder determines that the frequency domain range of the left channel frequency domain signal and right channel frequency domain signal that are the current frame and that are used to encode the group IPD parameters of the left channel frequency domain signal and right channel frequency domain signal of the current frame is a specific frequency domain range of the left channel frequency domain signal and right channel frequency domain signal of the current frame, for example, [k1, k2], to be specific, frequency domain signals between a $(k1)^{th}$ frequency and a (k2)th frequency, an IPD parameter of each of some subbands (to be specific, subbands of the frequency domain signals between the $(k1)^{th}$ frequency and the $(k2)^{th}$ frequency) of the left channel frequency domain signal and right channel frequency domain signal of the current frame may be extracted, an average value of IPD parameters of all extracted subbands may be calculated, and then the obtained average value of the IPD parameters of all of the subbands is used as the group IPD parameter of the current frame.

In one embodiment, the IPD parameters of the subbands of the frequency domain signals between the $(k1)^{th}$ frequency and the $(k2)^{th}$ frequency each may be predefined as an IPD parameter of each frequency. To be specific, in this case, calculation of the IPD parameters of the subbands may be replaced with calculation of the IPD parameter of each frequency. The group IPD parameter of the current frame is calculated by using the IPD parameter of each frequency as an IPD parameter of each subband. A manner of calculating the IPD parameter of each frequency one by one in a preset frequency domain range [k1, k2] is as follows:

$$IPD(k) = \angle L(k)R^*(k),\ k_1 \le k \le k_2.$$

Herein, ∠ indicates calculating an angle of a complex number. L(k) indicates a $k^{th}$ frequency value of an audio-left channel frequency domain signal, and R*(k) indicates a conjugate of a $k^{th}$ frequency value of an audio-right channel frequency domain signal.

Further, statistical processing may be performed on IPD (k) in a preset range (a multi-frame signal of a multi-channel frequency domain signal, including a current frame and A frames previous to the current frame) to obtain the group IPD parameter.

For example, if the specific frequency domain range [k1, k2] is a selection range of each of six frames of left channel frequency domain signal and right channel frequency domain signal, an average value of IPD parameters of $(k2-k1+1)^{th}$ frequencies of each frame in left channel frequency domain signal and right channel frequency domain signal with the six frames may be calculated, and a calculation formula is as follows:

$$M_{IPD}^{[0]} = \frac{1}{k_2 - k_1 + 1} \sum_{k=k_1}^{k_2} IPD(k).$$

Further, an average value of IPD parameters of six consecutive frames including the current frame may be calculated, and is used as the group IPD parameter of the current frame:

$$M_{IPD} = \frac{1}{6} \sum_{i=-5}^{0} M_{IPD}^{[i]}.$$

$M_{IPD}^{[0]}$ indicates an average value of IPD parameters of the current frame, $M_{IPD}^{[-1]}$ indicates an average value of IPD parameters of a frame previous to and adjacent to the current frame, $M_{IPD}^{[-2]}$ indicates an average value of IPD parameters of a frame previous to and adjacent to the frame previous to and adjacent to the current frame, and so on.

In one embodiment, the second encoding scheme may be an IPD parameter encoding scheme of a subband set, or a subband IPD parameter encoding scheme. For example, when an IPD parameter encoding scheme of the current frame is a subband IPD parameter extraction manner, an IPD parameter of each of all or some of subbands of the left channel frequency domain signal and right channel frequency domain signal of the current frame are extracted, and then the IPD parameter of the subband is quantized in any quantization manner. This is not specifically limited.

Figure 6:
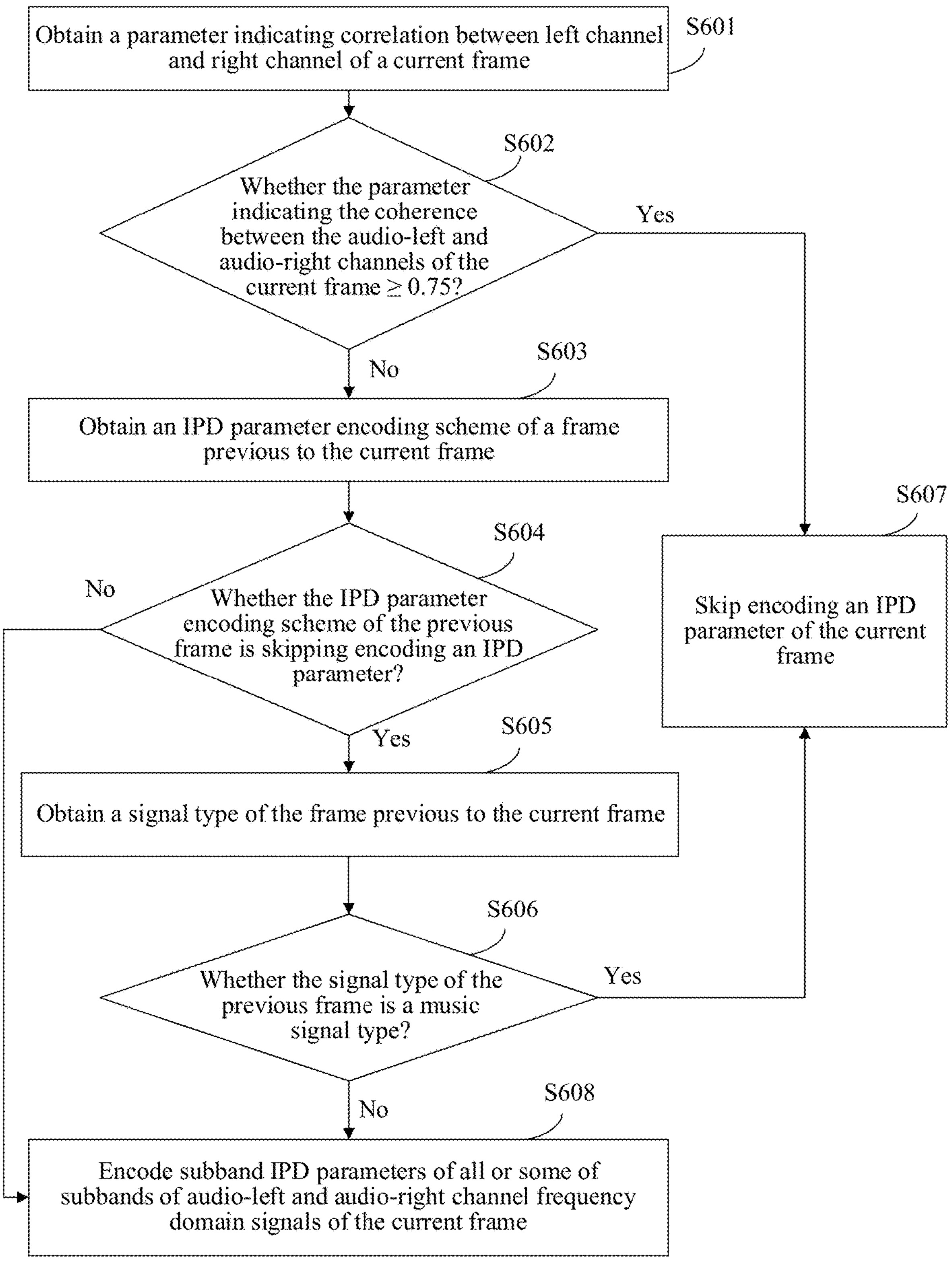
FIG. 6 is another schematic flowchart of an IPD parameter encoding method according to an embodiment of the present disclosure.

FIG. 6 describes a procedure of an IPD parameter encoding method according to another embodiment of the present disclosure. This embodiment is described by using an example in which a reference parameter includes: a parameter indicating correlation between left channel and right channel of a current frame, an IPD parameter encoding scheme of a frame previous to the current frame, and a signal type of the frame previous to the current frame, a value of a first threshold is 0.75, and a value of A is 1. As shown in FIG. 6, this embodiment includes the following operations.

Operation S601. Obtain the parameter indicating the correlation between the left channel and right channel of the current frame.

For a specific manner of obtaining the parameter indicating the correlation between the left channel and right channel of the current frame, refer to the foregoing description. Details are not described herein again.

Operation S602. Determine whether a value of the parameter indicating the correlation between the left channel and right channel of the current frame is greater than or equal to 0.75. If the value of the parameter indicating the correlation between the left channel and right channel is less than 0.75, go to operation S603; if the value of the parameter indicating the correlation between the left channel and right channel is greater than or equal to 0.75, go to operation S607.

Operation S603. Obtain the IPD parameter encoding scheme of the frame previous to the current frame.

The IPD parameter encoding scheme of the frame previous to the current frame may be stored in a cache. The IPD parameter encoding scheme of the previous frame may be skipping encoding an IPD parameter, or encoding subband IPD parameters of all or some of subbands of left channel frequency domain signal and right channel frequency domain signal.

Operation S604. Determine whether the IPD parameter encoding scheme of the frame previous to the current frame is skipping encoding the IPD parameter. If the IPD parameter encoding scheme of the frame previous to the current frame is skipping encoding the IPD parameter, go to operation S605. If the IPD parameter encoding scheme of the frame previous to the current frame is not skipping encoding the IPD parameter, go to operation S608.

Operation S605. Obtain the signal type of the frame previous to the current frame.

The signal type of the frame previous to the current frame may be stored in the cache. The signal type of the previous frame may be a music signal type or a voice signal type.

Operation S606. Determine whether the signal type of the frame previous to the current frame is the music signal type. If the signal type of the frame previous to the current frame is the music signal type, go to operation S607; if the signal type of the frame previous to the current frame is not the music signal type, go to operation S608.

Operation S607. Skip encoding the IPD parameter of the current frame, to be specific, determine that the IPD parameter encoding scheme of the current frame is skipping encoding the IPD parameter. End a processing procedure of the current frame.

Operation S608. Encode the subband IPD parameters of all or some of the subbands of the left channel frequency domain signal and right channel frequency domain signal of the current frame. A subband is in a one-to-one correspondence to a subband IPD parameter. In other words, each subband has a corresponding subband IPD parameter.

A specific process of obtaining the subband IPD parameter is described above, and details are not described herein again.

When the subband IPD parameters of some of the subbands of the left channel frequency domain signal and right channel frequency domain signal of the current frame are encoded, to-be-encoded subband IPD parameters of a specific part of subbands may be set based on a requirement. For example, it is assumed that there are a subbands in total, and frequency values of the a subbands gradually increase from a $0^{th}$ subband to an $(a-1)^{th}$ subband. In an embodiment, only subband IPD parameters from the $0^{th}$ subband to an $(a-3)^{th}$ subband may be encoded. In other words, subband IPD parameters of two subbands respectively with the highest frequency and the second highest frequency are not encoded. In another embodiment, only subband IPD parameters from a second subband to an $(a-1)^{th}$ subband may be encoded. In other words, subband IPD parameters of two subbands respectively with the lowest frequency and the second lowest frequency are not encoded. Certainly, subband IPD parameters of any two of the subbands may alternatively not be encoded. It may be understood that, in some embodiments, a quantity of subbands corresponding to encoded subband IPD parameters may be set based on a specific requirement. For example, subband IPD parameters of $(a-1)$ subbands in the a subbands may be encoded, or subband IPD parameters of $(a-2)$ subbands in the a subbands may be encoded, or subband IPD parameters of $(a-3)$ subbands in the a subbands may be encoded, or subband IPD parameters of $(a-4)$ subbands in the a subbands may be encoded.

It may be understood that a performing sequence of obtaining operations S601, S603, and S605 in FIG. 6 is not limited. Any one of the obtaining operations S601, S603, and S605 may be first performed, or the obtaining operations S601, S603, and S605 may be simultaneously performed. Similarly, a performing sequence of determining operations S602, S604, and S606 is not limited, either. Any one of the determining operations S602, S604, and S606 may be first performed, or the determining operations S602, S604, and S606 may be simultaneously performed.

Figure 7:
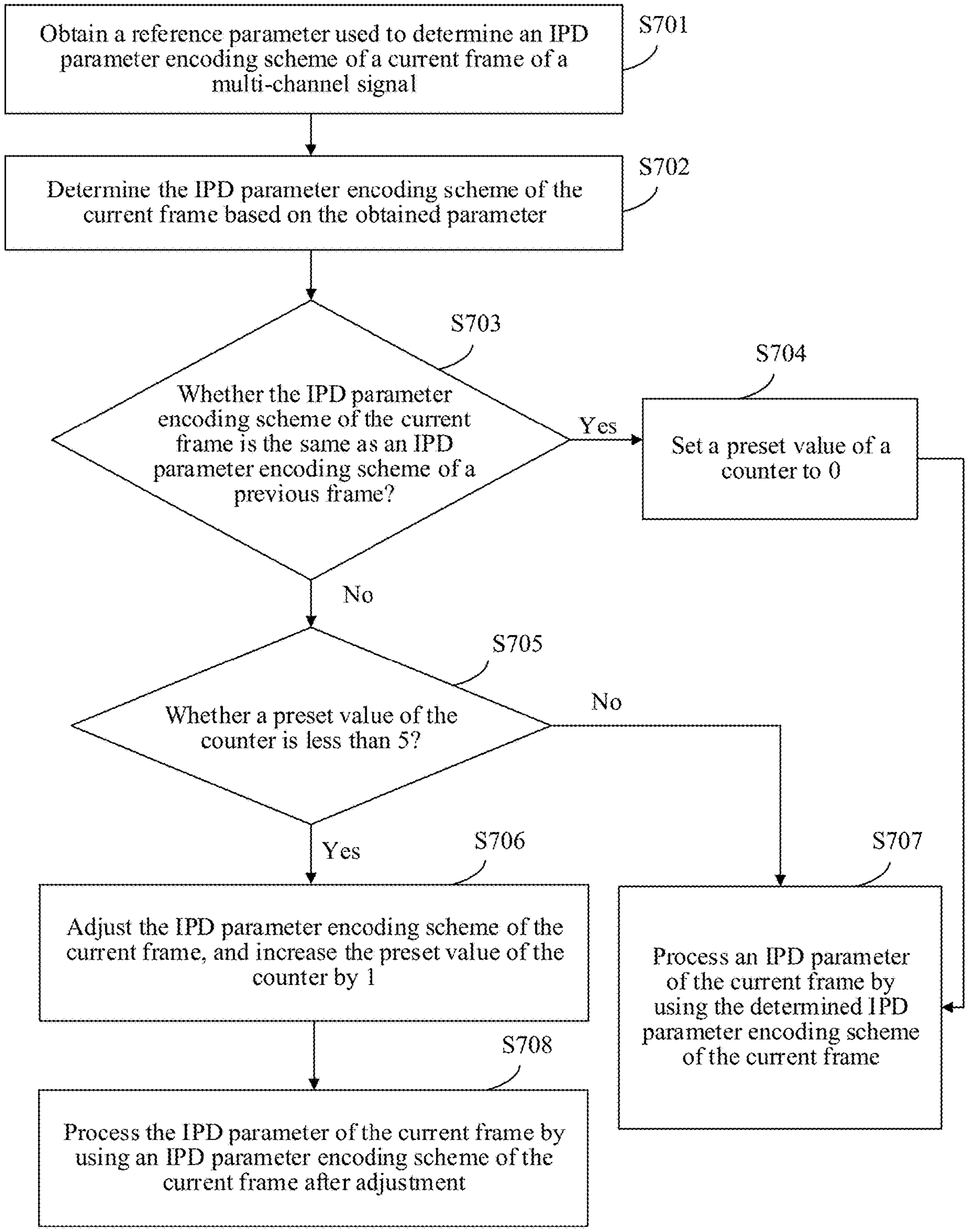
FIG. 7 is another schematic flowchart of an IPD parameter encoding method according to an embodiment of the present disclosure.

FIG. 7 describes a procedure of an IPD parameter encoding method according to another embodiment of the present disclosure. This embodiment includes the following operations.

Operation S701. Obtain a reference parameter used to determine an IPD parameter encoding scheme of a current frame of a multi-channel signal.

For a specific reference parameter and a specific manner of obtaining the reference parameter, refer to description in the foregoing embodiment. Details are not described herein again.

Operation S702. Determine the IPD parameter encoding scheme of the current frame based on the obtained parameter.

For the IPD parameter encoding scheme of the current frame, refer to the description in the foregoing embodiment. Details are not described herein again.

Operation S703. Determine whether the IPD parameter encoding scheme of the current frame is the same as an IPD parameter encoding scheme of a frame previous to the current frame. If the IPD parameter encoding scheme of the current frame is the same as the IPD parameter encoding scheme of the frame previous to the current frame, go to operation S704. If the IPD parameter encoding scheme of the current frame is different from the IPD parameter encoding scheme of the frame previous to the current frame, go to operation S705.

Operation S704. Set a preset value of a counter to 0, and go to operation S707.

In other words, the IPD parameter encoding scheme of the current frame does not need to be adjusted.

Operation S705. Determine whether a preset value of the counter is less than 5. If the preset value of the counter is less than 5, go to operation S706. If the preset value of the counter is greater than or equal to 5, go to operation S707.

Operation S706. Adjust the IPD parameter encoding scheme of the current frame, and increase the preset value of the counter by 1, and go to operation S708.

When the IPD parameter encoding scheme of the current frame is a first encoding scheme, the IPD parameter encoding scheme of the current frame is adjusted to a second encoding scheme. For example, when the IPD parameter encoding scheme of the current frame is skipping encoding an IPD parameter, the IPD parameter encoding scheme of the current frame is adjusted to encoding subband IPD parameters of all or some of subbands of left channel frequency domain signal and right channel frequency domain signal of the current frame. Alternatively, when the IPD parameter encoding scheme of the current frame is a second encoding scheme, the IPD parameter encoding scheme of the current frame is adjusted to a first encoding scheme. For example, when the IPD parameter encoding scheme of the current frame is encoding subband IPD parameters of all or some of subbands of left channel frequency domain signal and right channel frequency domain signal of the current frame, the IPD parameter encoding scheme of the current frame is adjusted to skipping encoding an IPD parameter.

Operation S707. Process an IPD parameter of the current frame by using the determined IPD parameter encoding scheme of the current frame. End a procedure.

Operation S708. Process an IPD parameter of the current frame by using the adjusted IPD parameter encoding scheme of the current frame.

In another embodiment of the present disclosure, when whether to adjust the IPD parameter encoding scheme of the current frame is to be determined, two counters may be used. A specific processing manner is as follows:

When the IPD parameter encoding scheme of the current frame and the IPD parameter encoding scheme of the frame previous to the current frame both are first encoding schemes, a value of a first counter is set to 0. If the IPD parameter encoding scheme of the frame previous to the current frame is the first encoding scheme, the IPD parameter encoding scheme of the current frame is the second encoding scheme, and the value of the first counter is less than 5, the IPD parameter encoding scheme of the current frame is adjusted to the first encoding scheme, and the value of the first counter is increased by 1. The first encoding scheme may be skipping encoding the IPD parameter, and the second encoding scheme may be encoding the subband IPD parameters of all or some of the subbands of the left channel frequency domain signal and right channel frequency domain signal.

When the IPD parameter encoding scheme of the current frame and the IPD parameter encoding scheme of the frame previous to the current frame both are second encoding schemes, a value of a second counter is set to 0. If the IPD parameter encoding scheme of the frame previous to the current frame is the second encoding scheme, the IPD parameter encoding scheme of the current frame is the first encoding scheme, and the value of the second counter is less than 5, the IPD parameter encoding scheme of the current frame is adjusted to the second encoding scheme, and the value of the second counter is increased by 1. The first encoding scheme may be skipping encoding the IPD parameter, and the second encoding scheme may be encoding the subband IPD parameters of all or some of the subbands of the left channel frequency domain signal and right channel frequency domain signal.

It may be understood that, if the IPD parameter encoding scheme of the current frame is adjusted, the adjusted IPD parameter encoding scheme of the current frame is cached. In other words, when an IPD parameter encoding scheme of a frame after the current frame is to be determined, refer to the adjusted IPD parameter encoding scheme of the current frame.

Figure 8:
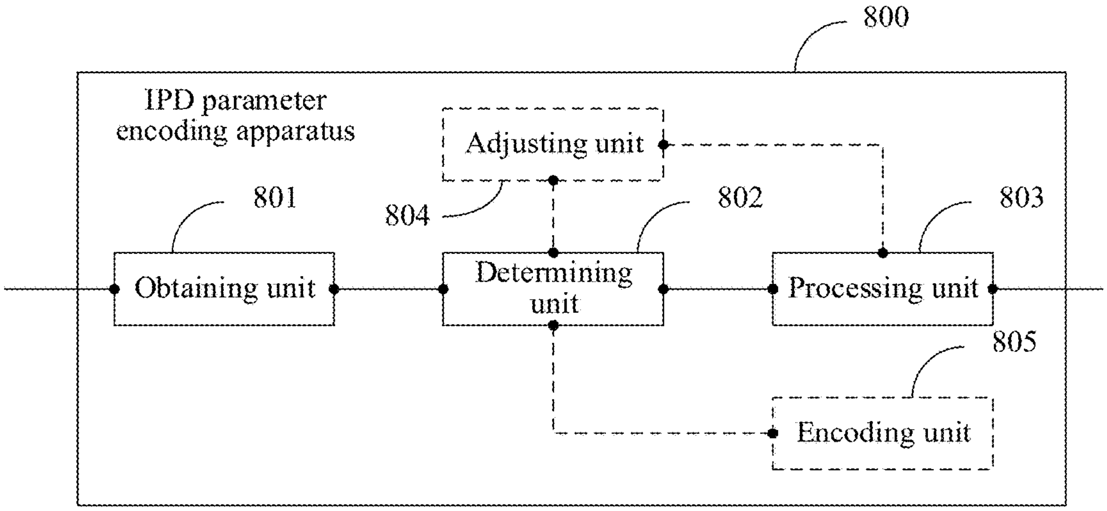
FIG. 8 is a schematic structural diagram of an IPD parameter encoding apparatus according to an embodiment of the present disclosure.

FIG. 8 is a schematic structural diagram of an embodiment of an IPD parameter encoding apparatus 800 according to an embodiment of the present disclosure. The IPD parameter encoding apparatus 800 includes:

- an obtaining unit 801, configured to obtain a reference parameter, where the reference parameter is used to determine an IPD parameter encoding scheme of a current frame of a multi-channel signal, and
- for a specific reference parameter and a specific obtaining parameter of the reference parameter, reference may be made to description in the foregoing embodiment, and details are not described herein again;
- a determining unit 802, configured to determine an IPD parameter encoding scheme of the current frame based on the reference parameter obtained by the obtaining unit 801, where the determined IPD parameter encoding scheme of the current frame is one of at least two preset IPD parameter encoding schemes, and
- for determining the IPD parameter encoding scheme of the current frame, reference may specifically be made to description in a method embodiment part, for specific encoding schemes of the at least two preset IPD parameter encoding schemes, reference may also be made to description in the method embodiment part, and details are not described herein again; and
- a processing unit 803, configured to process an IPD parameter of the current frame based on the IPD parameter encoding scheme that is of the current frame and that is determined by the determining unit 802.

For a specific processing process, refer to description in the method embodiment part. Details are not described herein again.

In another embodiment of the present disclosure, the determining unit 802 may further be configured to determine whether the determined IPD parameter encoding scheme of the current frame needs to be adjusted. In this case, as shown in FIG. 8, the IPD parameter encoding apparatus 800 may further include an adjusting unit 804, configured to adjust the determined IPD parameter encoding scheme of the current frame when the determining unit 802 determines that the determined IPD parameter encoding scheme of the current frame needs to be adjusted. Correspondingly, the processing unit 803 is specifically configured to process the IPD parameter of the current frame based on the adjusted IPD parameter encoding scheme of the current frame. For how to determine whether the determined IPD parameter encoding scheme of the current frame needs to be adjusted, and how to adjust the IPD parameter encoding scheme of the current frame, refer to description in the method embodiment. Details are not described herein again.

As shown in FIG. 8, in another embodiment of the present disclosure, the IPD parameter encoding apparatus 800 may further include an encoding unit 805, configured to encode the IPD parameter encoding scheme that is of the current frame and that is determined by the determining unit 802. For example, an encoding scheme flag bit may be set, and the flag bit occupies one bit, to indicate whether the IPD parameter encoding scheme of the current frame is a first encoding scheme or a second encoding scheme. In this way, a decoder can determine the IPD parameter encoding scheme of the current frame based on the encoding scheme flag bit, to perform decoding by using a corresponding decoding manner. It may be understood that, in some implementations, the encoding unit 805 and the processing unit 803 may be one logical unit.

Figure 9:
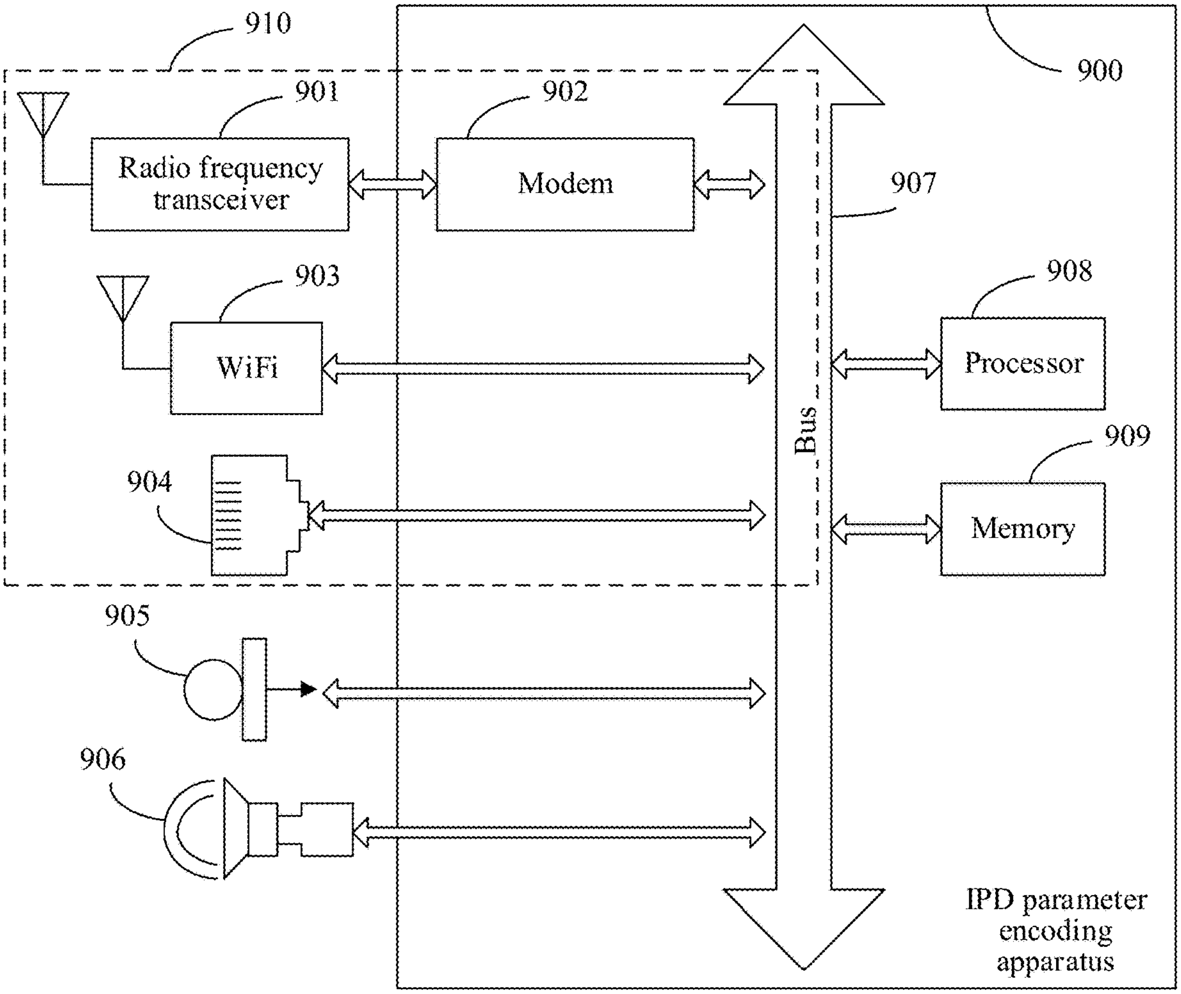
FIG. 9 is a schematic structural diagram of an IPD parameter encoding apparatus according to another embodiment of the present disclosure.

FIG. 9 describes a structure of a terminal according to another embodiment of the present disclosure. The terminal may be a wearable device, a VR device, an AR device, a mobile phone, a pad, a notebook, a PC, or the like. As shown in FIG. 9, the terminal provided in this embodiment of the present disclosure includes a network interface 910 (as shown in a dotted line box in FIG. 9). The network interface 910 is configured to send and receive data. For example, when the terminal serves as an encoder, sent data includes a multi-channel signal (carried in a code stream) encoded by the terminal. When an IPD parameter is encoded, the sent data further includes the IPD parameter (the IPD parameter is also carried in the code stream and may be used as a part of the multi-channel signal). When the terminal serves as a decoder, received data includes a code stream carrying the multi-channel signal. When the encoder encodes the IPD parameter, the received data may further include the IPD parameter. A specific form of the network interface 910 may be various, and may specifically be different based on a specific form of the terminal and different application scenarios. FIG. 9 shows three examples. A first example is a cellular network access module including a radio frequency transceiver (RF Transceiver) 901 and a modem (Modem) 902. The cellular network access module is configured to access a mobile communications network provided by a mobile operator, such as a 2G ($2^{nd}$ Generation), 3G ($3^{rd}$ Generation), 4G ($4^{th}$ Generation), to be specific, a long term evolution (LTE) network, future 5G ($5^{th}$ Generation) or 6G ($6^{th}$ Generation) network, or the like. A second example is a wireless fidelity (WiFi) module 903, configured to access a network by accessing an accessing point (AP). A third example is an Ethernet network adapter 904, configured to access the network by using a twisted pair cable or an optical fiber. It should be noted that the terminal does not need to include all of the foregoing three network interfaces, and may include only at least one of the foregoing three network interface terminals, so that the terminal can access the network. In addition, a network interface included in the terminal may not be one of the foregoing three types, for example, may be a Bluetooth interface or a modem. Therefore, a specific form of the network interface 910 is not limited in this embodiment of the present disclosure, and implementation of this embodiment of the present disclosure is not affected provided that the terminal can access the network through the network interface 910.

As shown in FIG. 9, the terminal may further include a microphone 905, configured to collect a multi-channel signal. An analog-to-digital converter may be built in the microphone 905. Therefore, the microphone may convert a collected multi-channel signal in an analog signal form into a multi-channel signal in a digital signal form. Certainly, no analog-to-digital converter may alternatively be built in the microphone 905. In this case, the terminal further needs to include an analog-to-digital converter, to perform analog-to-digital conversion on a multi-channel signal in an analog signal form collected by the microphone 905 and obtain a multi-channel signal in a digital signal form. There may be one, two, three, or more microphones 905. A specific quantity of microphones 905 is not limited in this embodiment of the present disclosure. It may be understood that the terminal may alternatively collect the multi-channel signal by using an external microphone. In this case, the terminal needs to include an adaptation interface of the external microphone, to facilitate insertion of the external microphone and then implement data exchange between the terminal and the external microphone.

As shown in FIG. 9, the terminal may further include a loudspeaker 906, configured to play a multi-channel signal obtained through decoding by the terminal. If a bitstream that includes the multi-channel signal and that is received by the terminal includes an IPD parameter, this decoding process may be performed based on the IPD parameter. A digital-to-analog converter may be built in the loudspeaker 906. In other words, the terminal may send a multi-channel signal in a digital signal form to the loudspeaker 906, and the loudspeaker 906 performs analog-to-digital conversion on the multi-channel signal in the digital signal form, to convert the multi-channel signal in the digital signal form into and play a multi-channel signal in an analog signal form. Certainly, no digital-to-analog converter may alternatively be built in the loudspeaker 906. In this case, the terminal needs to include an analog-to-digital converter to convert the multi-channel signal in the digital signal form into the multi-channel signal in the analog signal form, and sends the multi-channel signal in the analog signal form to the loudspeaker 906 for playing. There may be one, two, three, or more loudspeakers 906. A quantity of loudspeakers 906 is not limited in this embodiment of the present disclosure. It may be understood that the terminal may alternatively play the multi-channel signal by using an external loudspeaker. In this case, the terminal needs to include an adaptation interface of the external loudspeaker, to facilitate insertion of the external loudspeaker and then implement data exchange with the external loudspeaker.

As shown in FIG. 9, the terminal further includes a processor 908 and a memory 909. The memory 909 is configured to store code executable by the processor, and the processor 908 is configured to execute the code stored in the memory 909, to implement the method described in the foregoing method embodiments.

As shown in FIG. 9, the terminal further includes a bus 907. Data exchange between the foregoing components such as the network interface 910, the microphone 905, the loudspeaker 906, the processor 908, and the memory 909 may be performed by using the bus 907. It may be understood that FIG. 9 merely describes an example of the structure of the terminal. Some connection relationships in the structure are simplified. During actual application, components such as the network interface 910, the microphone 905, or the loudspeaker 906 may not be directly connected to the bus 907. In other words, data exchange between the components such as the network interface 910, the microphone 905, or the loudspeaker 906 may further need to pass through another component.

In one embodiment, the processor 908 and the memory 909 may further have a data exchange interface. Data exchange between the processor 908 and the memory 909 may be directly performed through the data exchange interface, and does not need to pass through the bus 907, to improve data exchange efficiency between the processor 908 and the memory 909.

In one embodiment, the processor 908 and the memory 909 may be a processor and a memory in a digital signal processor (DSP: Digital Signal Processor). In other words, both the processor 908 and the memory 909 are encapsulated in the DSP. In this case, data exchange between the processor 908 and the memory 909 may be performed through a data exchange interface inside the DSP. In addition, because both the processor 908 and the memory 909 are encapsulated in the DSP, the processor 908 and the memory 909 may exchange data with another component through one data exchange interface between the DSP and the bus 907.

An embodiment of the present disclosure further provides a computer program. When the computer program is executed, a procedure of any one of the foregoing method embodiments may be executed.

An embodiment of the present disclosure further provides a storage medium. The storage medium stores executable code, and when the executable code is executed, a procedure in any one of the foregoing method embodiments may be executed.

A person of ordinary skill in the art may understand that all or some of procedures of the method in the embodiments may be implemented by a computer program instructing related hardware. The program may be stored in a computer readable storage medium. When the program runs, the procedures of the method in the embodiments are included. The storage medium may include: a magnetic disk, an optical disc, a read-only memory (Read-Only Memory, ROM), a random access memory (Random Access Memory, RAM), or the like.

In the specification, claims, and accompanying drawings of the present disclosure, the terms “first”, “second”, “third”, “fourth”, and the like are intended to distinguish between different objects but do not indicate a specific order. In addition, the terms “include”, “have”, and any other variant thereof are intended to cover a non-exclusive inclusion. For example, a process, a method, a system, a product, or a device that includes a series of operations or units is not limited to the listed operations or units, but optionally further includes a operation or unit that is not listed, or optionally further includes another inherent operation or unit of the process, method, system, product, or device.

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An inter-channel phase difference (IPD) parameter encoding method, comprising:

obtaining a signal type of a first frame of an audio signal, wherein the signal type is either a music type or not a music type;

obtaining a first IPD parameter encoding scheme of the first frame, wherein the first IPD parameter encoding scheme is either a first preset IPD parameter encoding scheme or a second preset IPD parameter encoding scheme;

processing a first IPD parameter of the first frame based on the first IPD parameter encoding scheme;

determining, based on the signal type of the first frame and the first IPD parameter encoding scheme, a second IPD parameter encoding scheme of a second frame of the audio signal, wherein the second frame is subsequent to the first frame in time domain; wherein when the signal type of the first frame is not the music type, and the first IPD parameter encoding scheme is the first preset IPD parameter encoding scheme, the second IPD parameter encoding scheme is the second preset IPD parameter encoding scheme; or when the signal type of the first frame is the music type, and the first IPD parameter encoding scheme is the second preset IPD parameter encoding scheme, the second IPD parameter encoding scheme is the second preset IPD parameter encoding scheme; and processing a second IPD parameter of the second frame based on the second IPD parameter encoding scheme.

2. The method according to claim 1, further comprises:

obtaining a signal type of a third frame of the audio signal, wherein the first frame is subsequent to the third frame in time domain; and obtaining a third IPD parameter encoding scheme of the third frame, wherein the determining, based on the signal type of the first frame and the first IPD parameter encoding scheme, a second IPD parameter encoding scheme of a second frame of the audio signal comprises:

determining, based on the signal type of the first frame, the signal type of the third frame, the third IPD parameter encoding scheme and the first IPD parameter encoding scheme, the second IPD parameter encoding scheme.

3. The method according to claim 2, wherein:

when the signal type of the first frame is not the music type, the signal type of the third frame is the music type, the third IPD parameter encoding scheme is the first preset IPD parameter encoding scheme, and the first IPD parameter encoding scheme is the first preset IPD parameter encoding scheme, the second IPD parameter encoding scheme is the second preset IPD parameter encoding scheme;

when the signal type of the first frame is the music type, the signal type of the third frame is not the music type, the third IPD parameter encoding scheme is the first preset IPD parameter encoding scheme, and the first IPD parameter encoding scheme is the first preset IPD parameter encoding scheme, determining the second IPD parameter encoding scheme is the second preset IPD parameter encoding scheme;

when the signal type of the first frame is the music type, the signal type of the third frame is the music type, the third IPD parameter encoding scheme is the second preset IPD parameter encoding scheme, and the first IPD parameter encoding scheme is the first preset IPD parameter encoding scheme, determining the second IPD parameter encoding scheme is the second preset IPD parameter encoding scheme; or when the signal type of the first frame is the music type, the signal type of the third frame is the music type, the third IPD parameter encoding scheme is the first preset IPD parameter encoding scheme, and the first IPD parameter encoding scheme is the second preset IPD parameter encoding scheme, determining the second IPD parameter encoding scheme is the second preset IPD parameter encoding scheme.

4. The method according to claim 1, wherein the first preset IPD parameter encoding scheme comprises one of the following manners:

a group IPD parameter encoding scheme;

skipping encoding an IPD parameter; or setting a value of an IPD parameter to 0.

5. The method according to claim 1, wherein the second preset IPD parameter encoding scheme comprises an IPD parameter encoding scheme of a subband set, or a subband IPD parameter encoding scheme, and the subband IPD parameter encoding scheme indicates encoding subband IPD parameters of a subset or all of subbands of a current frame.

6. The method according to claim 5, wherein the second IPD parameter encoding scheme is the subband IPD parameter encoding scheme; and wherein the processing an IPD parameter of the second frame based on the second IPD parameter encoding scheme comprises:

calculating IPD parameters of all or a subset of subbands of left channel frequency domain signal and right channel frequency domain signal of the second frame; and encoding the IPD parameters that are of all or a subset of the subbands and that are obtained through calculation.

7. The method according to claim 1, further comprises:

performing encoding based on a determined IPD parameter encoding scheme of a current frame.

8. An inter-channel phase difference parameter encoding apparatus, comprising:

a memory for storing computer-executable instructions; and a processor operatively coupled to the memory, the processor being configured to execute the computer-executable instructions to:

obtain a signal type of a first frame of an audio signal, wherein the signal type is either a music type or not a music type;

obtain a first IPD parameter encoding scheme of the first frame, wherein the first IPD parameter encoding scheme is either a first preset IPD parameter encoding scheme or a second preset IPD parameter encoding scheme;

process a first IPD parameter of the first frame based on the first IPD parameter encoding scheme;

determine, based on the signal type of the first frame and the first IPD parameter encoding scheme, a second IPD parameter encoding scheme of a second frame of the audio signal, wherein the second frame is subsequent to the first frame in time domain; wherein when the signal type of the first frame is not the music type, and the first IPD parameter encoding scheme is the first preset IPD parameter encoding scheme, the second IPD parameter encoding scheme is the second preset IPD parameter encoding scheme; or when the signal type of the first frame is the music type, and the first IPD parameter encoding scheme is the second preset IPD parameter encoding scheme, the second IPD parameter encoding scheme is the second preset IPD parameter encoding scheme; and process a second IPD parameter of the second frame based on the second IPD parameter encoding scheme.

9. The inter-channel phase difference parameter encoding apparatus according to claim 8, wherein the processor being further configured to execute the computer-executable instructions to:

obtain a signal type of a third frame of the audio signal, wherein the first frame is subsequent to the third frame in time domain;

obtain a third IPD parameter encoding scheme of the third frame; and determine, based on the signal type of the first frame, the signal type of the third frame, the third IPD parameter encoding scheme and the first IPD parameter encoding scheme, the second IPD parameter encoding scheme.

10. The inter-channel phase difference parameter encoding apparatus according to claim 9, wherein:

when the signal type of the first frame is not the music type, the signal type of the third frame is the music type, the third IPD parameter encoding scheme is the first preset IPD parameter encoding scheme, and the first IPD parameter encoding scheme is the first preset IPD parameter encoding scheme, the second IPD parameter encoding scheme is the second preset IPD parameter encoding scheme;

when the signal type of the first frame is the music type, the signal type of the third frame is not the music type, the third IPD parameter encoding scheme is the first preset IPD parameter encoding scheme, and the first IPD parameter encoding scheme is the first preset IPD parameter encoding scheme, determining the second IPD parameter encoding scheme is the second preset IPD parameter encoding scheme;

when the signal type of the first frame is the music type, the signal type of the third frame is the music type, the third IPD parameter encoding scheme is the second preset IPD parameter encoding scheme, and the first IPD parameter encoding scheme is the first preset IPD parameter encoding scheme, determining the second IPD parameter encoding scheme is the second preset IPD parameter encoding scheme; or when the signal type of the first frame is the music type, the signal type of the third frame is the music type, the third IPD parameter encoding scheme is the first preset IPD parameter encoding scheme, and the first IPD parameter encoding scheme is the second preset IPD parameter encoding scheme, determining the second IPD parameter encoding scheme is the second preset IPD parameter encoding scheme.

11. The inter-channel phase difference parameter encoding apparatus according to claim 8, wherein the first preset IPD parameter encoding scheme comprises one of the following manners:

a group IPD parameter encoding scheme;

skipping encoding an IPD parameter; or setting a value of an IPD parameter to 0.

12. The inter-channel phase difference parameter encoding apparatus according to claim 8, wherein the second preset IPD parameter encoding scheme comprises an IPD parameter encoding scheme of a subband set, or a subband IPD parameter encoding scheme, and the subband IPD parameter encoding scheme indicates encoding subband IPD parameters of a subset or all of subbands of a current frame.

13. The inter-channel phase difference parameter encoding apparatus according to claim 12, wherein the second IPD parameter encoding scheme is the subband IPD parameter encoding scheme, and the processor being further configured to execute the computer-executable instructions to:

calculate IPD parameters of all or a subset of subbands of left channel frequency domain signal and right channel frequency domain signal of the second frame; and encode the IPD parameters that are of all or a subset of the subbands and that are obtained through calculation.

14. The inter-channel phase difference parameter encoding apparatus according to claim 8, the processor being further configured to execute the computer-executable instructions to:

perform encoding based on a determined IPD parameter encoding scheme of a current frame.

15. A non-transitory computer readable storage medium, comprising a computer program code, which, when executed by at least a processor, causes the processor to perform operations comprising:

obtaining a signal type of a first frame of an audio signal, wherein the signal type is either a music type or not a music type;

obtaining a first IPD parameter encoding scheme of the first frame, wherein the first IPD parameter encoding scheme is either a first preset IPD parameter encoding scheme or a second preset IPD parameter encoding scheme;

processing a first IPD parameter of the first frame based on the first IPD parameter encoding scheme;

determining, based on the signal type of the first frame and the first IPD parameter encoding scheme, a second IPD parameter encoding scheme of a second frame of the audio signal, wherein the second frame is subsequent to the first frame in time domain; wherein when the signal type of the first frame is not the music type, and the first IPD parameter encoding scheme is the first preset IPD parameter encoding scheme, the second IPD parameter encoding scheme is the second preset IPD parameter encoding scheme; or when the signal type of the first frame is the music type, and the first IPD parameter encoding scheme is the second preset IPD parameter encoding scheme, the second IPD parameter encoding scheme is the second preset IPD parameter encoding scheme; and processing a second IPD parameter of the second frame based on the second IPD parameter encoding scheme.

16. The non-transitory computer readable storage medium according to claim 15, wherein the operations further comprise:

obtaining a signal type of a third frame of the audio signal, wherein the first frame is subsequent to the third frame in time domain; and obtaining a third IPD parameter encoding scheme of the third frame; wherein the determining, based on the signal type of the first frame and the first IPD parameter encoding scheme, a second IPD parameter encoding scheme of a second frame of the audio signal comprises:

determining, based on the signal type of the first frame, the signal type of the third frame, the third IPD parameter encoding scheme and the first IPD parameter encoding scheme, the second IPD parameter encoding scheme.

17. The non-transitory computer readable storage medium according to claim 16, wherein:

when the signal type of the first frame is not the music type, the signal type of the third frame is the music type, the third IPD parameter encoding scheme is the first preset IPD parameter encoding scheme, and the first IPD parameter encoding scheme is the first preset IPD parameter encoding scheme, the second IPD parameter encoding scheme is the second preset IPD parameter encoding scheme;

when the signal type of the first frame is the music type, the signal type of the third frame is not the music type, the third IPD parameter encoding scheme is the first preset IPD parameter encoding scheme, and the first IPD parameter encoding scheme is the first preset IPD parameter encoding scheme, determining the second IPD parameter encoding scheme is the second preset IPD parameter encoding scheme;

when the signal type of the first frame is the music type, the signal type of the third frame is the music type, the third IPD parameter encoding scheme is the second preset IPD parameter encoding scheme, and the first IPD parameter encoding scheme is the first preset IPD parameter encoding scheme, determining the second IPD parameter encoding scheme is the second preset IPD parameter encoding scheme; or when the signal type of the first frame is the music type, the signal type of the third frame is the music type, the third IPD parameter encoding scheme is the first preset IPD parameter encoding scheme, and the first IPD parameter encoding scheme is the second preset IPD parameter encoding scheme, determining the second IPD parameter encoding scheme is the second preset IPD parameter encoding scheme.

18. The non-transitory computer readable storage medium according to claim 15, wherein the first preset IPD parameter encoding scheme comprises any one of the following manners:

a group IPD parameter encoding scheme;

skipping encoding an IPD parameter; or setting a value of an IPD parameter to 0.

19. The non-transitory computer readable storage medium according to claim 15, wherein the second preset IPD parameter encoding scheme comprises an IPD parameter encoding scheme of a subband set, or a subband IPD parameter encoding scheme, and the subband IPD parameter encoding scheme indicates encoding subband IPD parameters of a subset or all of subbands of a current frame.

20. The non-transitory computer readable storage medium according to claim 19, wherein the second IPD parameter encoding scheme is the subband IPD parameter encoding scheme; and the processing an IPD parameter of the second frame based on the second IPD parameter encoding scheme comprises:

calculating IPD parameters of all or a subset of subbands of left channel frequency domain signal and right channel frequency domain signal of the second frame; and encoding the IPD parameters that are of all or a subset of the subbands and that are obtained through calculation.

* * * * *